United States Patent
Kato et al.

(10) Patent No.: US 11,245,707 B2
(45) Date of Patent: Feb. 8, 2022

(54) COMMUNICATION TERMINAL, COMMUNICATION SYSTEM, COMMUNICATION CONTROL METHOD, AND RECORDING MEDIUM

(71) Applicant: Ricoh Company, Ltd., Tokyo (JP)

(72) Inventors: Yoshinaga Kato, Kanagawa (JP); Yoshiyuki Toda, Kanagawa (JP); Takahiro Asai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 382 days.

(21) Appl. No.: 16/369,830

(22) Filed: Mar. 29, 2019

(65) Prior Publication Data
US 2019/0306175 A1   Oct. 3, 2019

(30) Foreign Application Priority Data

Mar. 31, 2018 (JP) .............................. JP2018-070483
Mar. 13, 2019 (JP) .............................. JP2019-045788

(51) Int. Cl.
G06F 21/44    (2013.01)
G06K 9/00    (2006.01)
H04L 29/06    (2006.01)

(52) U.S. Cl.
CPC ............ *H04L 63/123* (2013.01); *G06F 21/44* (2013.01); *G06K 9/00201* (2013.01); *G06K 9/00255* (2013.01); *H04L 63/0861* (2013.01)

(58) Field of Classification Search
CPC ... H04L 63/123; H04L 63/0861; G06F 21/44; G06K 9/00201; G06K 9/00255; G06K 9/6228
See application file for complete search history.

(56) References Cited

U.S. PATENT DOCUMENTS 5,057,683 A * 10/1991 Fukuyama ............ H03K 17/16
                                                    250/214 B
9,217,634 B1 * 12/2015 Firmin ................... G06N 20/00
(Continued)

FOREIGN PATENT DOCUMENTS

CA          2297510 A1 *  8/2000 ............... G06F 1/28
JP       2010-135993        6/2010
(Continued)

OTHER PUBLICATIONS

H. Wu, L. Lou, C. Chen, S. Hirche and K. Kuhnlenz, "Cloud-Based Networked Visual Servo Control," in IEEE Transactions on Industrial Electronics, vol. 60, No. 2, pp. 554-566, Feb. 2013, doi: 10.1109/TIE.2012.2186775. (Year: 2013).*

(Continued)

*Primary Examiner* — Michael Robert Cammarata
(74) *Attorney, Agent, or Firm* — Xsensus LLP

(57) ABSTRACT

A communication terminal communicably connected with a server, including circuitry to: detect one or more objects in any one of one or more images that are sequentially captured with an imaging unit; count a number of object detections, every time a predetermined number of objects are detected in the image; and transmit, to the server, one or more items of image data each including each one of the detected one or more objects, based on a determination that the counted number of object detections reaches or exceeds a predetermined value.

15 Claims, 27 Drawing Sheets

(56) References Cited

U.S. PATENT DOCUMENTS

| | | | | |
|---|---|---|---|---|
| 2005/0094849 A1* | 5/2005 | Sung | ............... | G06K 9/00248 |
| | | | | 382/103 |
| 2011/0037852 A1* | 2/2011 | Ebling | ............... | G06K 9/00778 |
| | | | | 348/143 |
| 2011/0161140 A1* | 6/2011 | Polt | ............... | G07B 15/063 |
| | | | | 705/13 |
| 2011/0167184 A1* | 7/2011 | Suzuki | ............... | G06F 13/4243 |
| | | | | 710/107 |
| 2012/0064567 A1* | 3/2012 | Stakenborg | ............... | G01N 15/1245 |
| | | | | 435/39 |
| 2014/0139863 A1* | 5/2014 | Harada | ............... | H04N 1/00339 |
| | | | | 358/1.14 |
| 2014/0319232 A1* | 10/2014 | Gourlay | ............... | G05D 23/1905 |
| | | | | 236/51 |
| 2015/0199872 A1* | 7/2015 | George | ............... | G07F 17/3237 |
| | | | | 463/31 |
| 2015/0237227 A1* | 8/2015 | Saisho | ............... | H04N 5/23245 |
| | | | | 348/77 |
| 2015/0304225 A1* | 10/2015 | Nishiyama | ............... | H04L 67/12 |
| | | | | 709/232 |
| 2016/0094876 A1* | 3/2016 | Nelson | ............... | H04N 21/45 |
| | | | | 725/14 |
| 2016/0182432 A1* | 6/2016 | De | ............... | H04L 12/2803 |
| | | | | 709/204 |
| 2016/0189489 A1* | 6/2016 | Au | ............... | G06K 7/1413 |
| | | | | 235/383 |
| 2016/0204879 A1* | 7/2016 | Niewczas | ............... | H04B 11/00 |
| | | | | 455/41.1 |
| 2016/0240057 A1* | 8/2016 | Galburt | ............... | G08B 29/183 |
| 2018/0302414 A1* | 10/2018 | Wagner | ............... | G06K 9/00885 |
| 2019/0042895 A1* | 2/2019 | Liang | ............... | G06K 9/00288 |
| 2019/0080197 A1* | 3/2019 | Kato | ............... | G06T 5/006 |
| 2019/0293539 A1* | 9/2019 | Manautou | ............... | G01N 21/84 |
| 2020/0160036 A1* | 5/2020 | Kato | ............... | G06K 9/00362 |
| 2020/0348662 A1* | 11/2020 | Cella | ............... | G05B 23/0289 |

FOREIGN PATENT DOCUMENTS

| | | |
|---|---|---|
| JP | 2016-519812 | 7/2016 |
| WO | WO2004/046985 A1 | 6/2004 |
| WO | WO2014/145877 A2 | 9/2014 |

OTHER PUBLICATIONS

Y. Han, D. Seed, C. Wang, X. Li, Q. Ly and Z. Chen, "Delay-Aware Application Protocol for Internet of Things," in IEEE Network, vol. 33, No. 1, pp. 120-127, Jan./Feb. 2019, doi: 10.1109/MNET.2018.1700369. (Year: 2019).*

A. Călugăru, V. T. Dădarlat, A. Peculea and E. Cebuc, "Real Time System for Detecting and Tracking People," 2018 17th RoEduNet Conference: Networking in Education and Research (RoEduNet), 2018, pp. 1-6, doi: 10.1109/ROEDUNET.2018.8514137. (Year: 2018).*

Hitoshi Imaoka et al., "Face Recognition Technology and its Application: Features on Elemental Technologies and Solutions Supporting Public Safety", Biometrics Authentication, NEC Technical Journal, vol. 63, No. 3, Sep. 2010, pp. 26-30.

* cited by examiner

HEMISPHERICAL IMAGE (FRONT)

HEMISPHERICAL IMAGE (BACK)

CAPTURED IMAGE (EQUIRECTANGULAR PROJECTION IMAGE EC)

FIG. 10A

| MODEL NUMBER (TYPE) | NUMBER OF IMAGING ELEMENTS | LENS TYPE |
|---|---|---|
| AAA111 | 1 | WIDE-ANGLE LENS |
| AAA112 | 2 | FISH-EYE LENS |
| ... | ... | ... |

FIG. 10B

| NUMBER OF IMAGING ELEMENTS | CYCLE VALUE (fps) |
|---|---|
| 1 | 60 |
| 2 | 30 |
| ... | ... |

FIG. 11A

| NUMBER OF IMAGING ELEMENTS | IMAGE ACQUISITION PROGRAM | INSTALL |
|---|---|---|
| 1 | ProgC01 (1 SYSTEM) | 1 |
| 2 | ProgC02 (2 SYSTEMS) | 1 |
| ... | ... | ... |

FIG. 11B

| NUMBER OF IMAGING ELEMENTS | IMAGE COMPOSITION PROGRAM | INSTALL |
|---|---|---|
| 1 | ProgS01 (IMAGE COMPOSITION) | 0 |
| 2 | ProgS02 (IMAGE COMPOSITION) | 1 |
| ... | ... | ... |

FIG. 11C

| LENS TYPE | DISTORTION CORRECTION PROGRAM | INSTALL |
|---|---|---|
| WIDE-ANGLE LENS | ProgW01 (WIDE-ANGLE CORRECTION) | 1 |
| FISH-EYE LENS | ProgW02 (FISH-EYE CORRECTION) | 1 |
| ... | ... | ... |

FIG. 11D

| AUTHENTICATION SERVER ID | SERVICE PROGRAM | INSTALL |
|---|---|---|
| a01 | ProgD01 (OBJECT DETECTION) | 1 |
| a02 | ProgD02 (OBJECT COUNTING) | 1 |
| a03 | ProgD03 (... PROCESS) | ... |

FIG. 12

| VERIFICATION DATA FILE NAME | NAME |
|---|---|
| kato.jpg | Kato |
| asai.jpg | Asai |
| ... | ... |

FIG. 13

SESSION MANAGEMENT TABLE

| SESSION ID | TERMINAL ID | IP ADDRESS |
|---|---|---|
| se01 | asai@myhost.ricoo.com/theta1 | 1.2.1.3 |
| se02 | asai@myhost.ricoo.com/pc | 1.2.1.4 |
| se03 | jim@myhost.obrom.com/theta2 | 1.2.2.3 |
| ... | ... | ... |

FIG. 15

AUTHENTICATION SERVER MANAGEMENT TABLE

| AUTHENTICATION SERVER ID | AUTHENTICATION SERVER URL |
|---|---|
| a01 | http:// ... |
| a02 | http:// ... |
| a03 | http:// ... |
| ... | ... |

FIG. 16A

AUTHENTICATION MANAGEMENT TABLE

| USER ID (SUBJECT FOR AUTHENTICATION) | PASSWORD |
|---|---|
| asai@myhost.ricoo.com | aaaa |
| jim@myhost.obrom.com | abab |
| ... | ... |

FIG. 16B

AUTHENTICATION MANAGEMENT TABLE

| USER ID (SUBJECT FOR AUTHENTICATION) | PASSWORD |
|---|---|
| asai | baba |
| kurt | bbbb |
| ... | ... |

FIG. 16C

AUTHENTICATION MANAGEMENT TABLE

| USER ID (SUBJECT FOR AUTHENTICATION) | PASSWORD |
|---|---|
| kondo | caca |
| kulbaski | cccc |
| ... | ... |

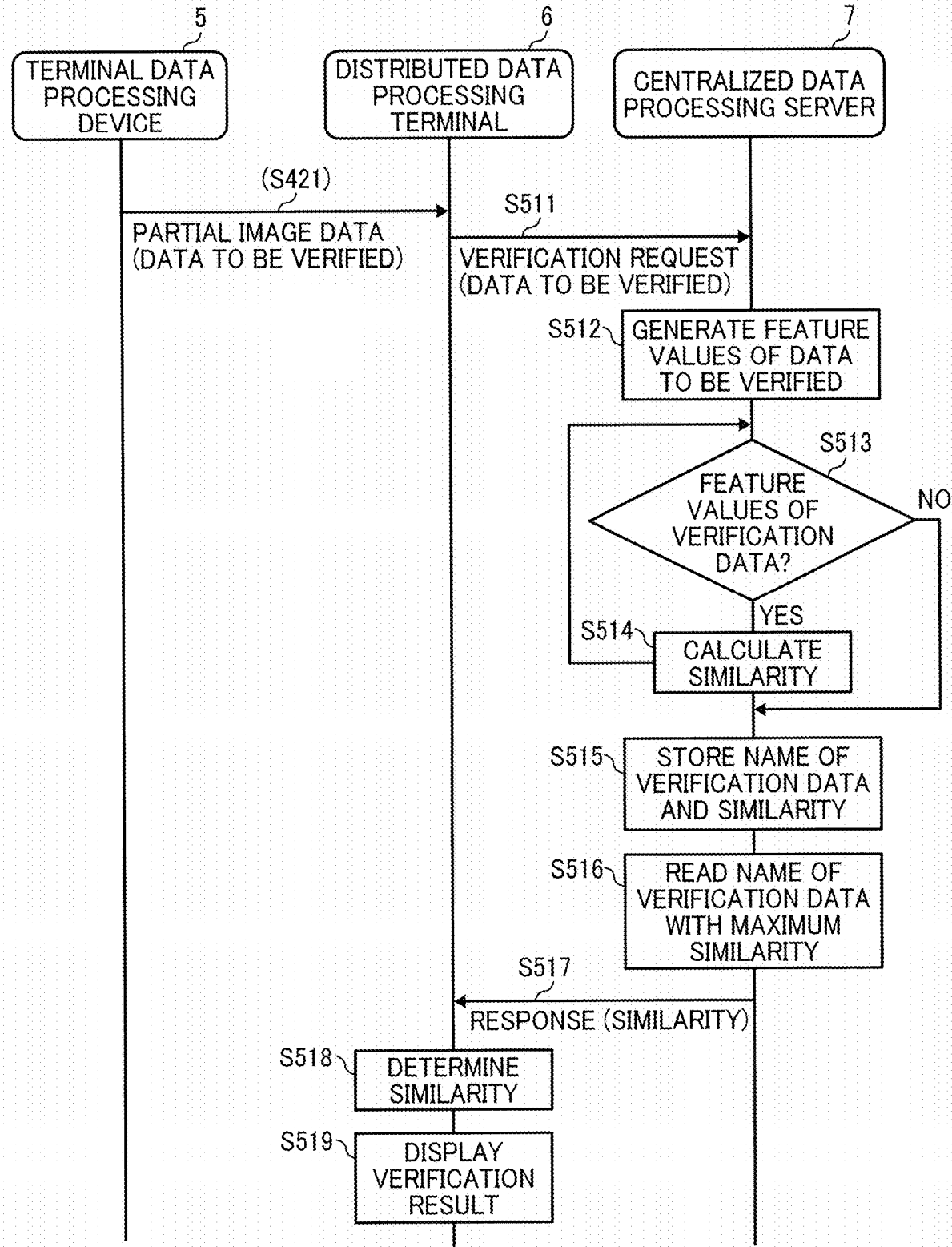

COMMUNICATION TERMINAL, COMMUNICATION SYSTEM, COMMUNICATION CONTROL METHOD, AND RECORDING MEDIUM

CROSS-REFERENCE TO RELATED APPLICATIONS

This patent application is based on and claims priority pursuant to 35 U.S.C. § 119(a) to Japanese Patent Application Nos. 2018-070483 filed on Mar. 31, 2018, and 2019-045788, filed on Mar. 13, 2019, in the Japan Patent Office, the entire disclosure of which is hereby incorporated by reference herein.

BACKGROUND

Technical Field

The present disclosure relates to a communication terminal, a communication system, a communication control method, and a recording medium.

Description of the Related Art

Recently, Internet of Things (IoT) attracts attention, such as communication systems utilizing edge computing. In such communication system, a terminal acquires image data, and transmits the image data to a server via the Internet to request for processing to analyze the image data. For example, a cloud service platform is known, which performs processing to recognize a human face at a server. Specifically, a camera is provided at the image acquisition terminal (edge node). The image acquisition terminal transmits image data captured at the camera to a server, to request for performing processing to recognize a human face in the captured image.

In the above-described communication system, the image acquisition terminal transmits the request for processing to the server every time a particular object (such as a human face) is detected. In some cases, the request for processing is repeatedly transmitted for the same object.

SUMMARY

Example embodiments of the present invention include a communication terminal communicably connected with a server, including circuitry to: detect one or more objects in any one of one or more images that are sequentially captured with an imaging unit; count a number of object detections, every time a predetermined number of objects are detected in the image; and transmit, to the server, one or more items of image data each including each one of the detected one or more objects, based on a determination that the counted number of object detections reaches or exceeds a predetermined value.

Example embodiments of the present invention include a communication system including: a data processing terminal communicably connected to the communication terminal and the server; and the communication terminal. The communication terminal communicates with the server via the data processing terminal, which: transmits a request for verifying the first object to the server, with the first image data and the second image data received from the communication terminal; and receives a response including a verification result based on similarity between the first image data and the second image data.

Example embodiments of the present invention include a method of controlling communication, and a recording medium storing a program for controlling communication.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 10A is a conceptual diagram illustrating an example of image element data management table;

FIG. 10B is a conceptual diagram illustrating an example of cycle value management table;

FIG. 11A is a conceptual diagram illustrating an example of image acquisition program management table;

FIG. 11B is a conceptual diagram illustrating an example of image composition program management table;

FIG. 11C is a conceptual diagram illustrating an example of distortion correction program management table;

FIG. 11D is a conceptual diagram illustrating an example of service program management table;

FIG. 12 is a conceptual diagram illustrating an example of verification data management table;

FIG. 13 is a conceptual diagram illustrating an example of session management table;

FIG. 15 is a conceptual diagram illustrating an example of authentication server management table;

FIGS. 16A, 16B, and 16C are each a conceptual diagram illustrating an example of authentication management table;

FIG. 30 is a sequence diagram illustrating a modified example of verifying the data to be verified, according to a second embodiment.

Figure 1:
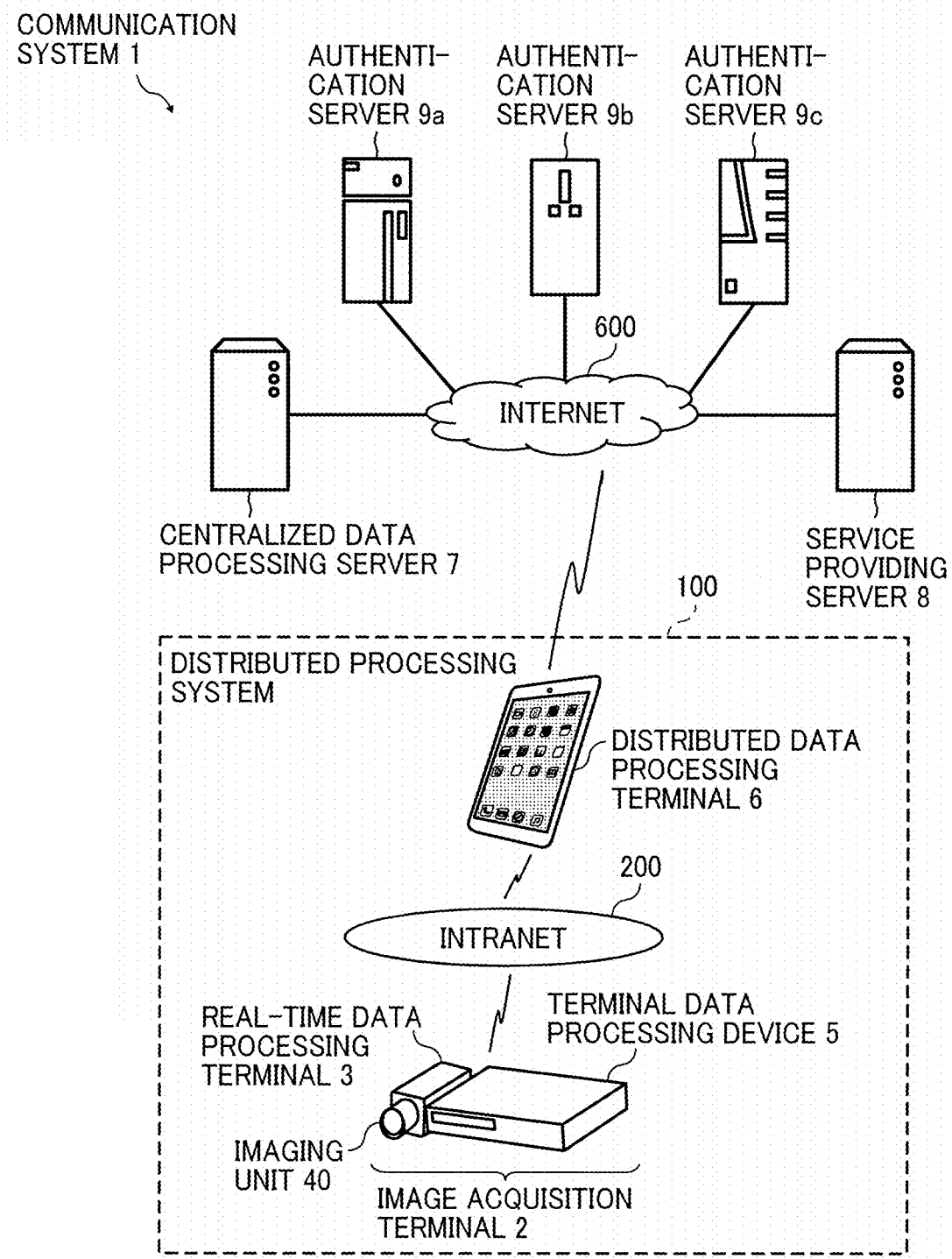
FIG. 1 is a schematic diagram illustrating a communication system according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Overview

Referring to the drawings, one or more embodiments of the present invention are described. The following describes a communication system for edge computing. As described below, the image acquisition terminal 2 and the service providing server 8 operate in cooperation with each other to provide various types of services. Specifically, the image acquisition terminal 2, as an edge device, performs operation according to various types of services provided by the service providing server 8.

<<System Configuration>>

FIG. 1 is a schematic diagram illustrating a configuration of a communication system 1 according to an embodiment. As illustrated in FIG. 1, the communication system 1 of this embodiment includes a real-time data processing terminal 3, a terminal data processing device 5, a distributed data processing terminal 6, the centralized data processing server 7, a service providing server 8, and a plurality of authentication servers 9a, 9b, and 9c. The real-time data processing terminal 3, the terminal data processing device 5, and the distributed data processing terminal 6 together operate as a distributed processing system 100. While a plurality of distributed processing systems 100 can be provided, FIG. 1 only illustrates one distributed processing system 100 for simplicity.

The terminal data processing device 5 is communicably connected to the distributed data processing terminal 6 via the intranet 200. The distributed data processing terminal 6 is communicably connected to the centralized data processing server 7, the service providing server 8, and the authentication servers 9a, 9b, and 9c via the Internet 600. In this disclosure, the authentication servers 9a, 9b, and 9c are collectively referred to as the authentication server 9.

The real-time data processing terminal 3 is a terminal that captures images in real-time to obtain real-time captured image data. This processing to capture images in real-time may be referred to as real-time processing. The real-time data processing terminal 3 is detachably connected to an imaging unit 40 provided with an image sensor that captures an image of a target, such as a Complementary Metal Oxide Semiconductor (CMOS) sensor or a Charge Coupled Device (CCD) sensor. The real-time data processing terminal 3 digitizes the captured image, which is input from the imaging unit 40, into captured image data, and detects a specific object (here, an image of a human face) in the captured image in real-time (for example, every 1/60 seconds). The real-time data processing terminal 3 transmits, to the terminal data processing device 5, data of a partial image of the captured image having the detected object ("partial image data"). While a human face is a target for detection in this disclosure, any other part of a human body may be detected to generate a captured image, such as a human head, an upper body or a lower body of the human, a part of the human face such as eyes, etc. In alternative to or in addition to the human, any object such as an automobile or an animal may be subjected to detection. When an automobile is a target for detection, a driver or a passenger in the automobile, or a license plate attached to the automobile, may be detected. When an animal is a target for detection, a face, or a pattern of its body may be detected.

The terminal data processing device 5, which is located closely to the real-time data processing terminal 3, is connected to the real-time data processing terminal 3 in a one-to-one correspondence, for example, by a data bus, a Universal Serial Bus (USB), or the like. The terminal data processing device 5 encodes the partial image data received from the real-time data processing terminal 3 into encoded partial image data in a general-purpose format such as Joint Photographic Experts Group (JPEG). The terminal data processing device 5 further transmits the encoded partial image data to the distributed data processing terminal 6 via the intranet 200, as data to be verified in processing of facial image verification. The real-time data processing terminal 3 and the terminal data processing device 5 are connected with each other so as to together function as the image acquisition terminal 2. While only one image acquisition terminal 2 is shown in this figure, any number of image acquisition terminals 2 may be provided in the system.

The distributed data processing terminal 6 is a computer that accepts various operations from a user, and is disposed at a location relatively close to the terminal data processing device 5, compared to a location of the centralized data processing server 7 with respect to the distributed data processing terminal 6. The distributed data processing terminal 6 previously registers verification data for facial image verification. The distributed data processing terminal 6 transmits a request, via the Internet 600, for requesting the centralized data processing server 7 to verify the data to be verified, using the verification data. In such case, the distributed data processing terminal 6 also transmits, to the centralized data processing server 7, the data to be verified that is received from the terminal data processing device 5 and the pre-registered verification data. In response, the distributed data processing terminal 6 receives, from the centralized data processing server 7, verification result information indicating the verification result including similarity. Further, the distributed data processing terminal 6 displays the received verification result via a graphical interface.

The centralized data processing server 7 is disposed at a location relatively far from the terminal data processing device 5, compared to a location of the terminal data processing device 5 to the distributed data processing terminal 6. The centralized data processing server 7 communicates with the distributed data processing terminal 6 via a communication network such as the Internet 600. In response to reception of the verification request, the verification data, and the data to be verified, the centralized data processing server 7 compares between the verification data and the data to be verified to calculate the degree of similarity. The centralized data processing server 7 transmits verification result information indicating the verification result that includes the calculated similarity to the distributed data processing terminal 6. The verification result information may further include, for example, a device identifier (ID) of the distributed data processing terminal 6 that has transmitted the verification request, a device ID of the image acquisition terminal 2 that has transmitted the data to be verified, the calculated date and time, a target for verification such as a name of a person being verified or a number being verified that may be obtained using the calculated similarity. In case a target for verification is an object other than the person, such as an automobile, aircraft, train, or article (goods), a name, a machine type, an ID code, etc. for identifying a particular object may be included.

The service providing server 8 provides the image acquisition terminal 2 with various services.

The authentication server 9 authenticates the image acquisition terminal 2, to determine whether or not the image acquisition terminal 2 has authorized authority to receive various services from the service providing server 8. As described below, authentication of the image acquisition terminal 2 is performed using an ID of the distributed data processing terminal 6 managing the image acquisition terminal 2.

<<Hardware Configuration>>

Referring now to FIGS. 2 to 6, a hardware configuration of the communication system 1 is described according to the embodiment.

<Hardware Configuration of Real-Time Data Processing Terminal>

Figure 2:
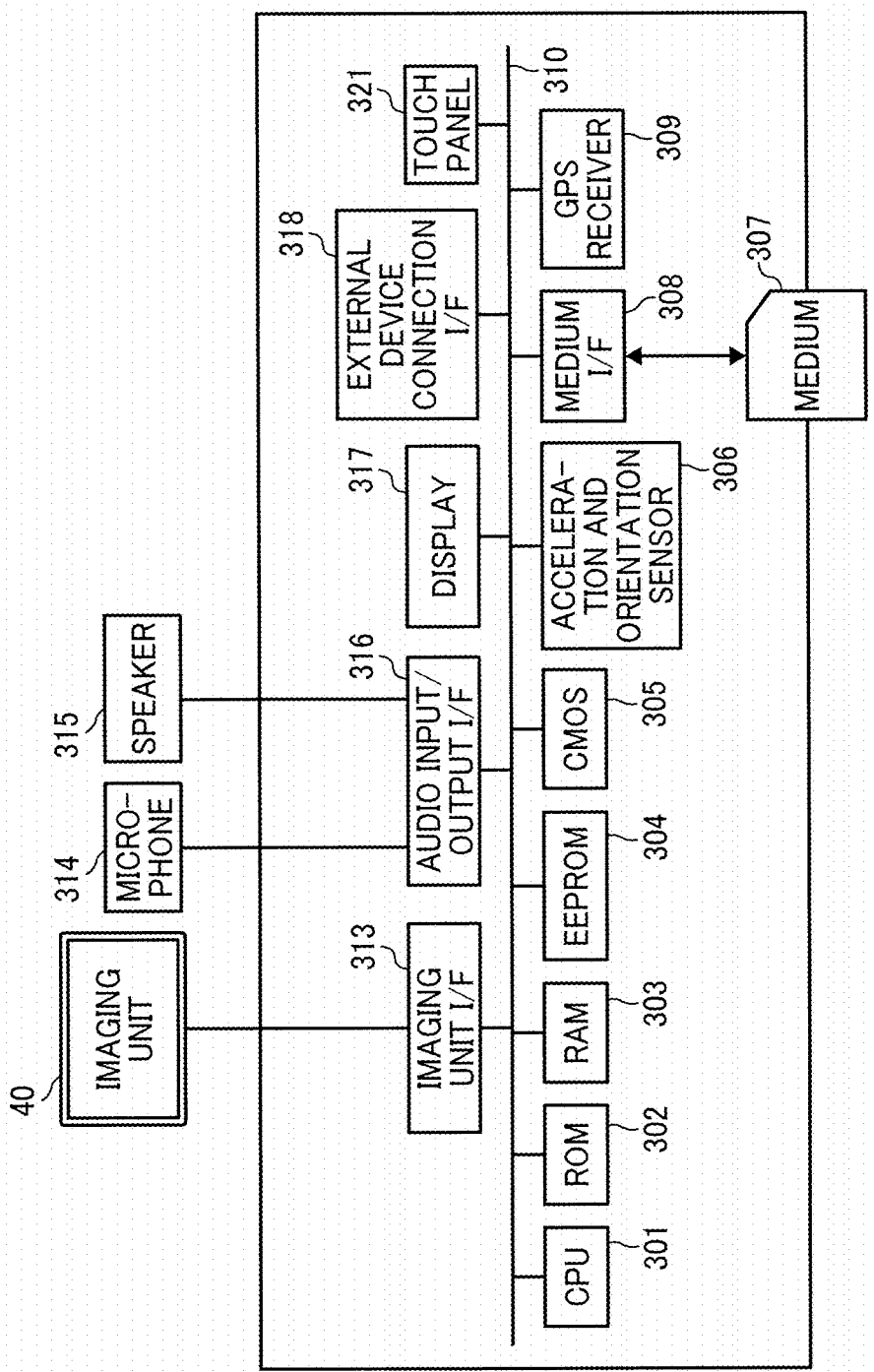
FIG. 2 is a schematic diagram illustrating a hardware configuration of a real-time data processing terminal, according to an embodiment.

FIG. 2 is a schematic diagram illustrating a hardware configuration of the real-time data processing terminal 3, according to the embodiment. The real-time data processing terminal 3 includes a CPU 301, a ROM 302, a RAM 303, an EEPROM 304, a CMOS sensor (CMOS) 305, an acceleration and orientation sensor 306, a medium I/F 308, and a GPS receiver 309.

The CPU 301 controls entire operation of the real-time data processing terminal 3. The ROM 302 stores a control program for operating the CPU 301. The RAM 303 is used as a work area for the CPU 301. The EEPROM 304 reads or writes various data such as a control program for the real-time data processing terminal 3 under control of the CPU 301. Under control of the CPU 301, the CMOS sensor 305 captures an image of a target (mainly a blind spot of the imaging unit 40) to obtain captured image data. The acceleration and orientation sensor 306 includes various sensors such as an electromagnetic compass for detecting geomagnetism, a gyrocompass, and an acceleration sensor. The medium I/F 308 controls reading or writing of data with respect to a recording medium 307 such as a flash memory. The GPS receiver 309 receives a GPS signal from a GPS satellite.

The real-time data processing terminal 3 further includes an imaging unit I/F 313, a microphone 314, a speaker 315, an audio input/output I/F 316, a display 317, an external device connection I/F 318, and a touch panel 321.

The imaging unit I/F 313 is a circuit that controls driving of the imaging unit 40 when an external imaging unit 40 is connected to the real-time data processing terminal 3. The microphone 314 is an example of built-in audio collecting device capable of inputting audio under control of the CPU 301. The audio I/O I/F 316 is a circuit for inputting or outputting an audio signal to the microphone 314 or from the speaker 315 under control of the CPU 301. The display 317 may be a liquid crystal or organic electro luminescence (EL) display that displays an image of a target, an operation icon, or the like. The external device connection I/F 318 is an interface circuit that connects the real-time data processing terminal 3 to various external devices. The touch panel 321 is an example of input device that enables the user to input a user instruction to the real-time data processing terminal 3 through touching a screen of the display 317.

The real-time data processing terminal 3 further includes a bus line 310. The bus line 310 is an address bus or a data bus, which electrically connects the elements in FIG. 2 such as the CPU 301.

<Hardware Configuration of Imaging Unit>

Figure 3A:
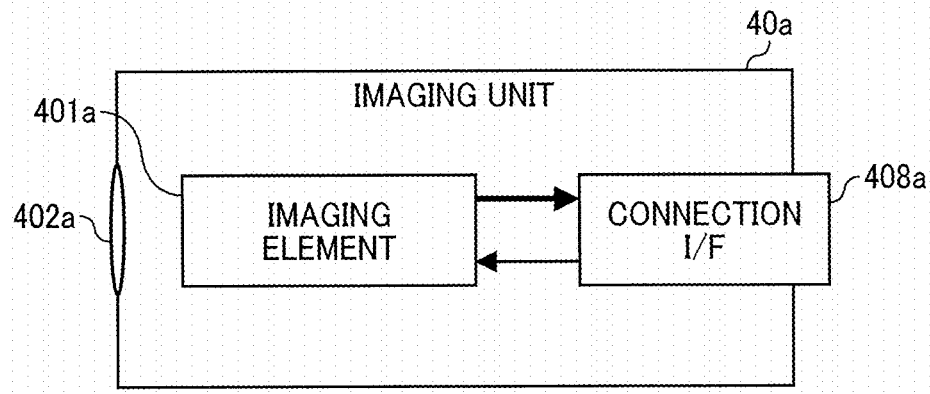
FIGS. 3A and 3B (FIG. 3) are schematic diagrams each illustrating an example of a hardware configuration of an imaging unit, according to an embodiment.
Figure 3B:
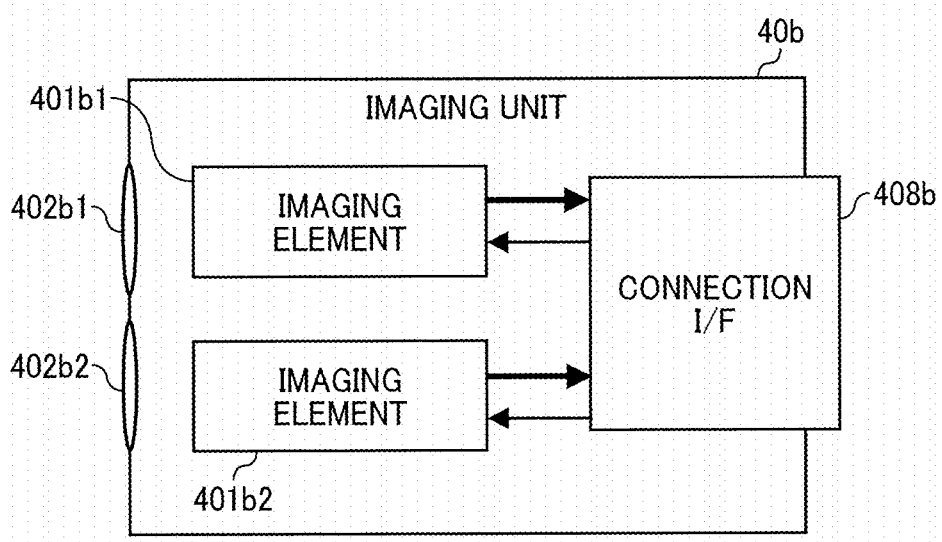

FIGS. 3A and 3B are each a schematic block diagram illustrating a hardware configuration of the imaging unit 40, according to the embodiment. Specifically, FIG. 3A illustrates a hardware configuration of a monocular imaging unit 40a, as an example of the imaging unit 40. FIG. 3B illustrates a hardware configuration of a compound eye imaging unit 40b, as an example of the imaging unit 40. The imaging unit 40 is a generic term for a plurality of types of imaging units (imaging unit 40a, 40b, etc.) having different number of imaging elements or having different types of imaging elements. As described below, example types of imaging elements include, but not limited to, standard zoom lens, fish-eye lens, wide-angle lens, which may be determined according to a specific application of the imaging unit 40.

As illustrated in FIG. 3A, the imaging unit 40a includes an imaging element 401a such as a CMOS or a CCD, a lens 402a, and a connection I/F 408a to be electronically connected to the imaging unit I/F 313 of the real-time data processing terminal 3. The lenses 402a is, for example, a standard lens, wide-angle lens, or fish-eye lens, which is suitable to correct distortion. When the imaging unit 40a is connected to the imaging unit I/F 313 of the real-time data processing terminal 3, the imaging element 401a captures an image according to an imaging control signal transmitted from the imaging unit I/F 313 via the connection I/F 408a. Accordingly, the imaging unit 40a illustrated in FIG. 3A obtains a planar image.

As illustrated in FIG. 3B, the imaging unit 40b includes imaging elements 401b1 and 401b2 each may be a CMOS or a CCD, lenses 402b1 and 402b2, and a connection I/F 408b to be electronically connected to the imaging unit I/F 313 of the real-time data processing terminal 3. The lenses 402b1 and 402b2 are, for example, fish-eye lenses. When the imaging unit 40b is connected to the imaging unit I/F 313 of the real-time data processing terminal 3, each of the imaging element 401b1 and 401b2 captures an image according to an imaging control signal transmitted from the imaging unit I/F 313 via the connection I/F 408b, and transmits the captured image to the imaging unit I/F 313. Accordingly, a plurality of images is transmitted as captured image data. Accordingly, the imaging unit 40b illustrated in FIG. 3B obtains a spherical image, which may be referred to as an equirectangular projection image as described below.

Figure 4A:
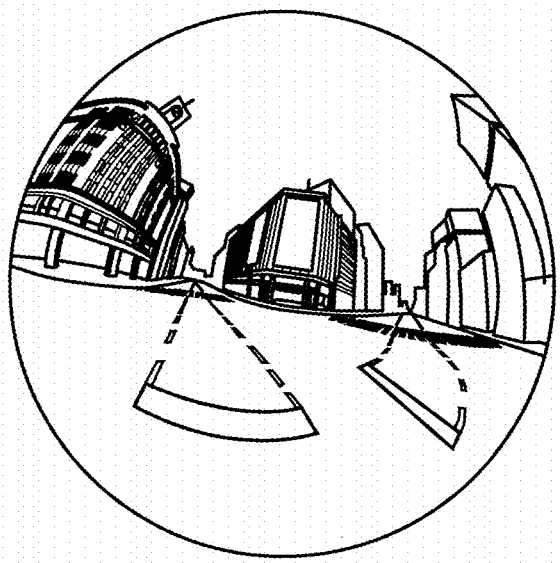
FIG. 4A is a view illustrating a hemispherical image (front side) captured by the imaging unit of FIG. 3B.
Figure 4B:
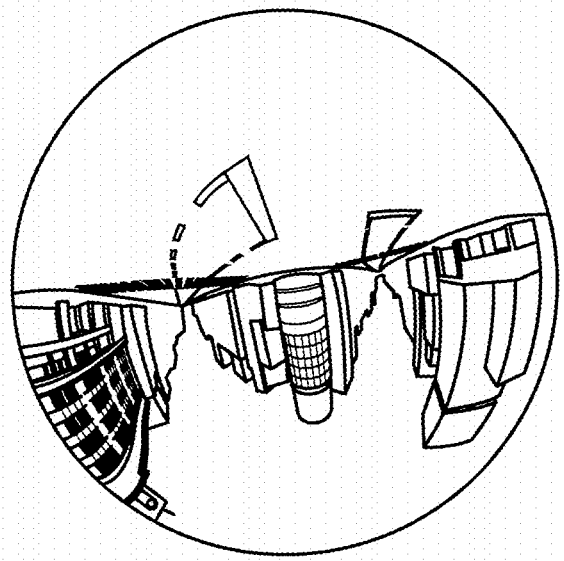
FIG. 4B is a view illustrating a hemispherical image (back side) captured by the imaging unit of FIG. 3B.
Figure 4C:
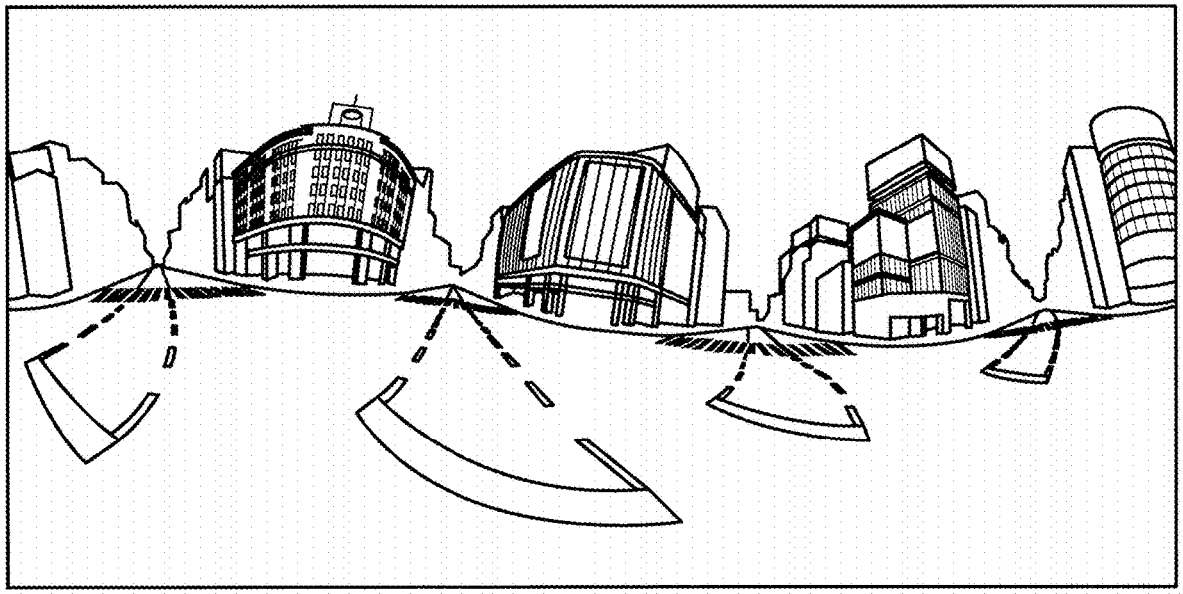
FIG. 4C is a view illustrating an image in equirectangular projection, generated by the imaging unit of FIG. 3B.

Next, referring to FIGS. 4A to 4C, a description is given of an overview of operation of generating an equirectangular projection image EC from the images captured by the imaging unit 40b. FIG. 4A is a view illustrating a hemispherical image (front side) captured by the imaging unit 40b. FIG. 4B is a view illustrating a hemispherical image (back side) captured by the imaging unit 40b. FIG. 4C is a view illustrating an image in equirectangular projection, which is referred to as an "equirectangular projection image" (or equidistant cylindrical projection image) EC.

As illustrated in FIG. 4A, an image captured by the imaging element 401b1 is a curved hemispherical image (front side) taken through the lens 402b1. Similarly, as illustrated in FIG. 4B, an image captured by the imaging element 401b2 is a curved hemispherical image (back side) taken through the lens 402b2. The hemispherical image (front side) and the hemispherical image (back side), which are reversed by 180-degree from each other, are combined by the real-time data processing terminal 3. This results in generation of the equirectangular projection image EC as illustrated in FIG. 4C. Here, the lenses are arranged to face each other, such that the front side and the back side of the imaging unit 40 can be captured to obtain hemispherical images of both sides, to generate the equirectangular projection image EC as illustrated in FIG. 4C.

<Hardware Configuration of Terminal Data Processing Device and Distributed Data Processing Terminal>

Figure 5:
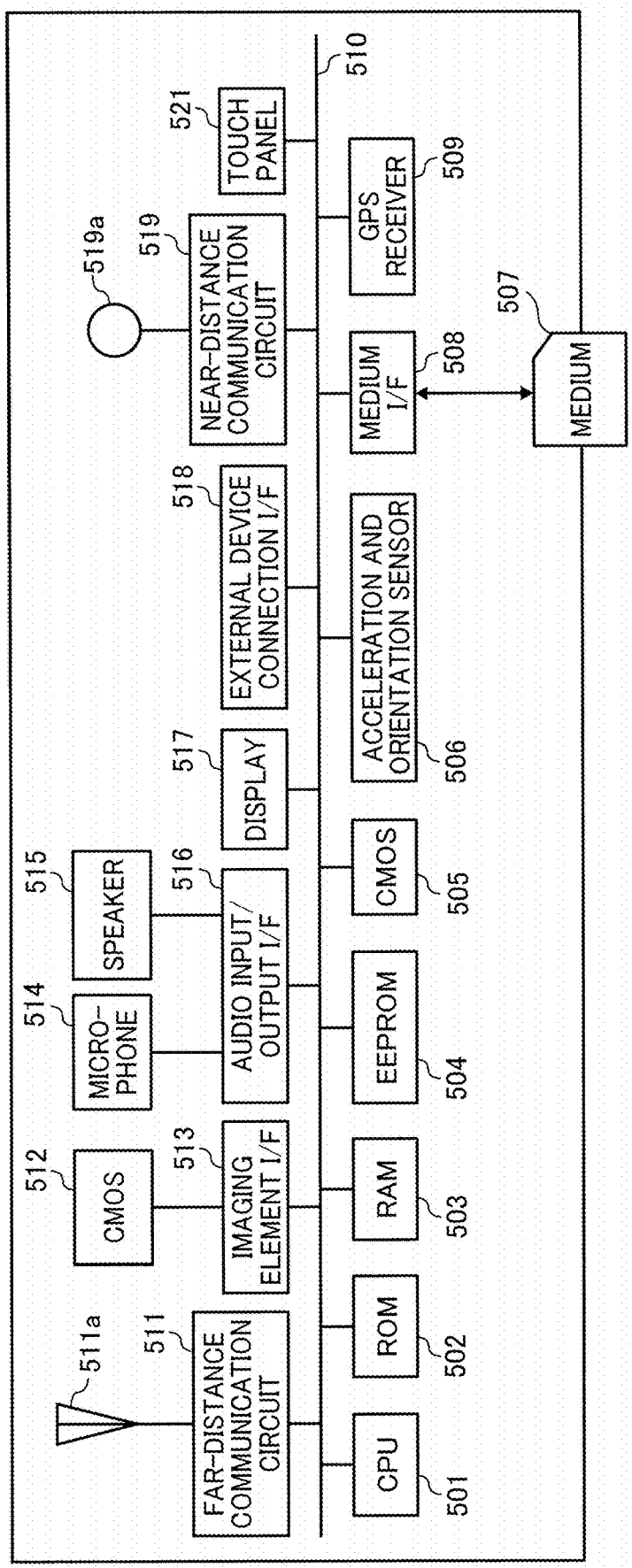
FIG. 5 is a schematic diagram illustrating a hardware configuration of each one of a terminal data processing device and a distributed data processing terminal, according to the embodiment.

FIG. 5 is a schematic diagram illustrating a hardware configuration of each one of the terminal data processing device 5 and the distributed data processing terminal 6, according to the embodiment. Since the terminal data processing device 5 and the distributed data processing terminal 6 are substantially the same in hardware configuration, an example case of the terminal data processing device 5 is described below, while omitting the description of the distributed data processing terminal 6.

As illustrated in FIG. 5, the terminal data processing device 5 includes a CPU 501, a ROM 502, a RAM 503, an EEPROM 504, a CMOS sensor 505, an acceleration and orientation sensor 506, a medium I/F 508, and a GPS receiver 509.

The CPU 501 controls entire operation of the terminal data processing device 5. The ROM 502 stores a control program for controlling the CPU 501. The RAM 503 is used as a work area for the CPU 501. The EEPROM 504 reads or writes various data such as a control program for the terminal data processing device 5 under control of the CPU 501. The CMOS sensor 505 captures an object (for example, a self-image of the user operating the terminal data processing device 5) under control of the CPU 501 to obtain captured image data. The acceleration and orientation sensor 506 includes various sensors such as an electromagnetic compass for detecting geomagnetism, a gyrocompass, and an acceleration sensor. The medium I/F 508 controls reading or writing of data with respect to a recording medium 507 such as a flash memory. The GPS receiver 509 receives a GPS signal from a GPS satellite.

The terminal data processing device 5 further includes a far-distance communication circuit 511, an antenna 511a for the far-distance communication circuit 511, a CMOS sensor 512, an imaging element I/F 513, a microphone 514, a speaker 515, an audio input/output I/F 516, a display 517, an external device connection IN 518, a near-distance communication circuit 519, an antenna 519a for the near-distance communication circuit 519, and a touch panel 521.

The far-distance communication circuit 511 is a circuit that communicates with another device through the intranet 200, for example. The camera 112 is an example of built-in imaging device capable of capturing a target under control of the CPU 501. The imaging element I/F 513 is a circuit that controls driving of the CMOS 512. The microphone 514 is an example of built-in audio collecting device capable of inputting audio under control of the CPU 501. The audio I/O I/F 516 is a circuit for inputting or outputting an audio signal to the microphone 514 or from the speaker 515 under control of the CPU 501. The display 517 may be a liquid crystal or organic electro luminescence (EL) display that displays an image of a subject, an operation icon, or the like. The external device connection I/F 518 is an interface circuit that connects the terminal data processing device 5 to various external devices. The near-distance communication circuit 519 is a communication circuit that communicates in compliance with the near field radio communication (NFC) (Registered Trademark), the Bluetooth (Registered Trademark), and the like. The touch panel 521 is an example of input device that enables the user to input a user instruction for operating the terminal data processing device 5 through touching a screen of the display 517.

The terminal data processing device 5 further includes a bus line 510. The bus line 510 may be an address bus or a data bus, which electrically connects various elements such as the CPU 501 of FIG. 5.

<Hardware Configuration of Centralized Data Processing Server>

Figure 6:
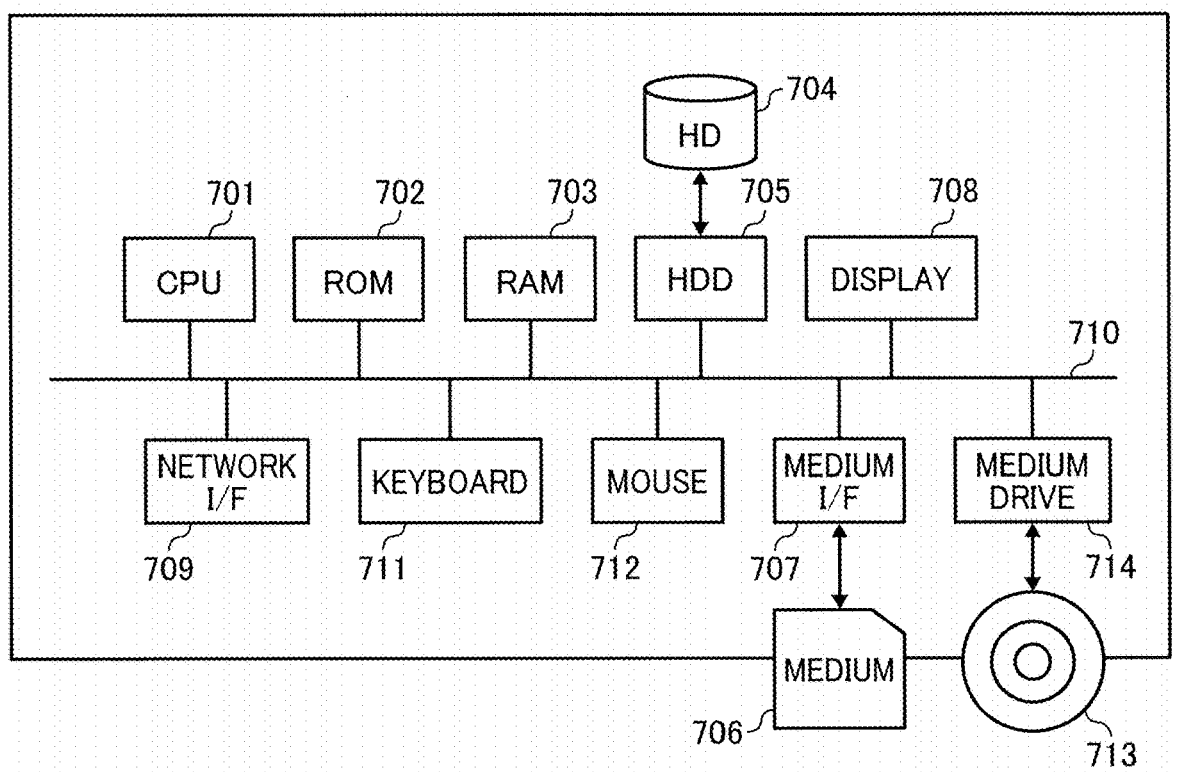
FIG. 6 is a schematic diagram illustrating a hardware configuration of any one of centralized data processing server, service providing server, and authentication server, according to the embodiment.

FIG. 6 is a schematic diagram illustrating a hardware configuration of any one of the centralized data processing server 7, the service providing server 8, and the authentication server 9, according to the embodiment. Since the centralized data processing server 7, the service providing server 8, and the authentication server 9 are substantially the same in hardware configuration, an example case of the centralized data processing server 7 is described below, while omitting the description of the service providing server 8 and the authentication server 9.

FIG. 6 is a schematic diagram illustrating a hardware configuration of the centralized data processing server 7, according to the embodiment. Referring to FIG. 6, the centralized data processing server 7, which is implemented by the general-purpose computer, includes a CPU 701, a ROM 702, a RAM 703, a hard disk (HD) 704, a hard disk drive (HDD) 705, a medium I/F 707, a display 708, a network I/F 709, a keyboard 711, a mouse 712, a medium drive 714, and a bus line 710. Since the centralized data processing server 7 operates as a server, an input device such as the keyboard 711 and the mouse 712, or an output device such as the display 708 does not have to be provided.

The CPU 701 controls entire operation of the centralized data processing server 7. The ROM 702 stores a control program for controlling the CPU 701. The RAM 703 is used as a work area for the CPU 701. The HD 704 stores various data such as programs. The HDD 705 controls reading or writing of various data to or from the HD 704 under control of the CPU 701. The medium I/F 707 controls reading or writing of data with respect to a recording medium 706 such as a flash memory. The display 708 displays various information such as a cursor, menu, window, characters, or image. The network IN 709 is an interface that controls communication of data with an external device through the Internet 600. The keyboard 711 is one example of input device provided with a plurality of keys for allowing a user to input characters, numerals, or various instructions. The mouse 712 is one example of input device for allowing the user to select a specific instruction or execution, select a target for processing, or move a curser being displayed. The medium drive 714 reads or writes various data with respect to an optical disc 713 such as a Compact Disc ReWritable (CD-RW), DVD, and Blue-disc, as an example of removable recording medium.

The centralized data processing server 7 further includes a bus line 710. The bus line 710 is an address bus or a data bus, which electrically connects the elements in FIG. 6 such as the CPU 701. The service providing server 8 and the authentication server 9 each have the same hardware configuration as described above.

<<Software Configuration>>

Figure 7:
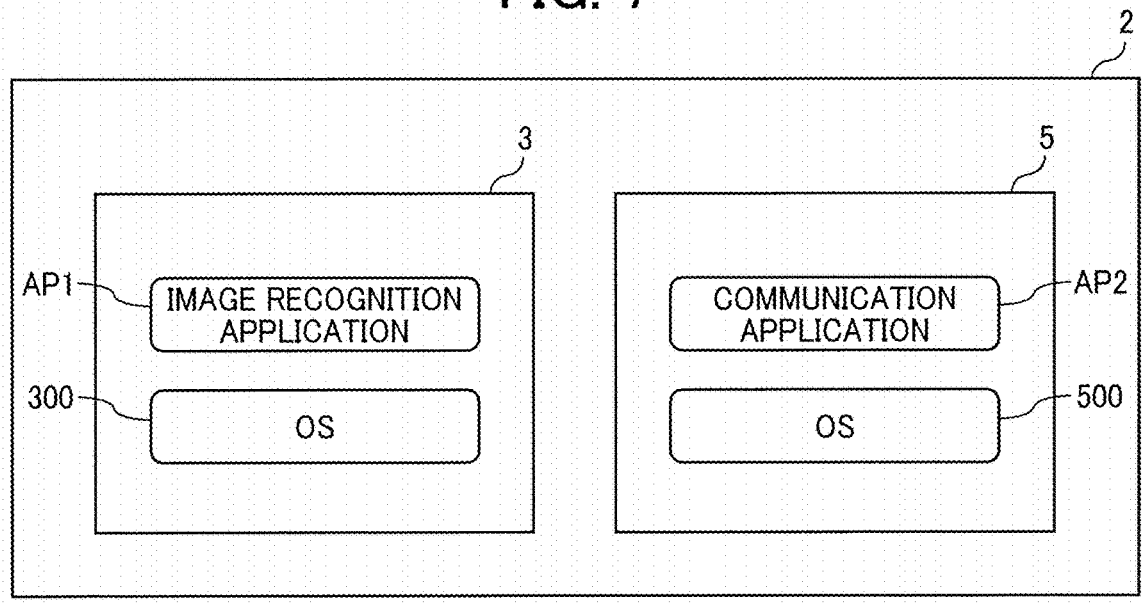
FIG. 7 is a schematic diagram illustrating a software configuration of the real-time data processing terminal and the terminal data processing device, according to the embodiment.

FIG. 7 is a schematic diagram illustrating a software configuration of the real-time data processing terminal 3 and the terminal data processing device 5, which together operate as the image acquisition terminal 2, according to the embodiment.

As illustrated in FIG. 7, the real-time data processing terminal 3 includes OS 300, and image recognition application AP1. The image recognition application AP1 is deployed in a work area, such as the RAM 303 of the real-time data processing terminal 3. The OS 300 is basic software that controls entire operation of the real-time data processing terminal 3 through providing basic functions. The image recognition application AP1 is an application for recognizing faces of people, animals, etc. from the captured images.

The terminal data processing device 5 includes OS 500 and communication application AP2. The communication application AP2 is deployed in a work area, such as the RAM 503 of the terminal data processing device 5. The OS 500 is basic software that controls entire operation of the terminal data processing device 5 through providing basic functions. The communication application AP2 is an application for communicating with another terminal (device) such as the distributed data processing terminal 6.

In the image acquisition terminal 2, while the real-time data processing terminal 3 performs image recognition, the terminal data processing device 5 communicates with the distributed data processing terminal 6 via the intranet 200 to perform distributed processing to transmit the partial image data as data to be verified, or receive a verification result.

Note that the real-time data processing terminal 3 and the terminal data processing device 5 are each installed with not only the OS but also a driver, a software development kit (SDK), or an application programming interface (API) that may be different between the real-time data processing terminal 3 and the terminal data processing device 5.

Referring to FIGS. 8 to 16C, a functional configuration of the communication system 1 is described according to one or more embodiments.

<<Functional Configuration>>

Figure 8:
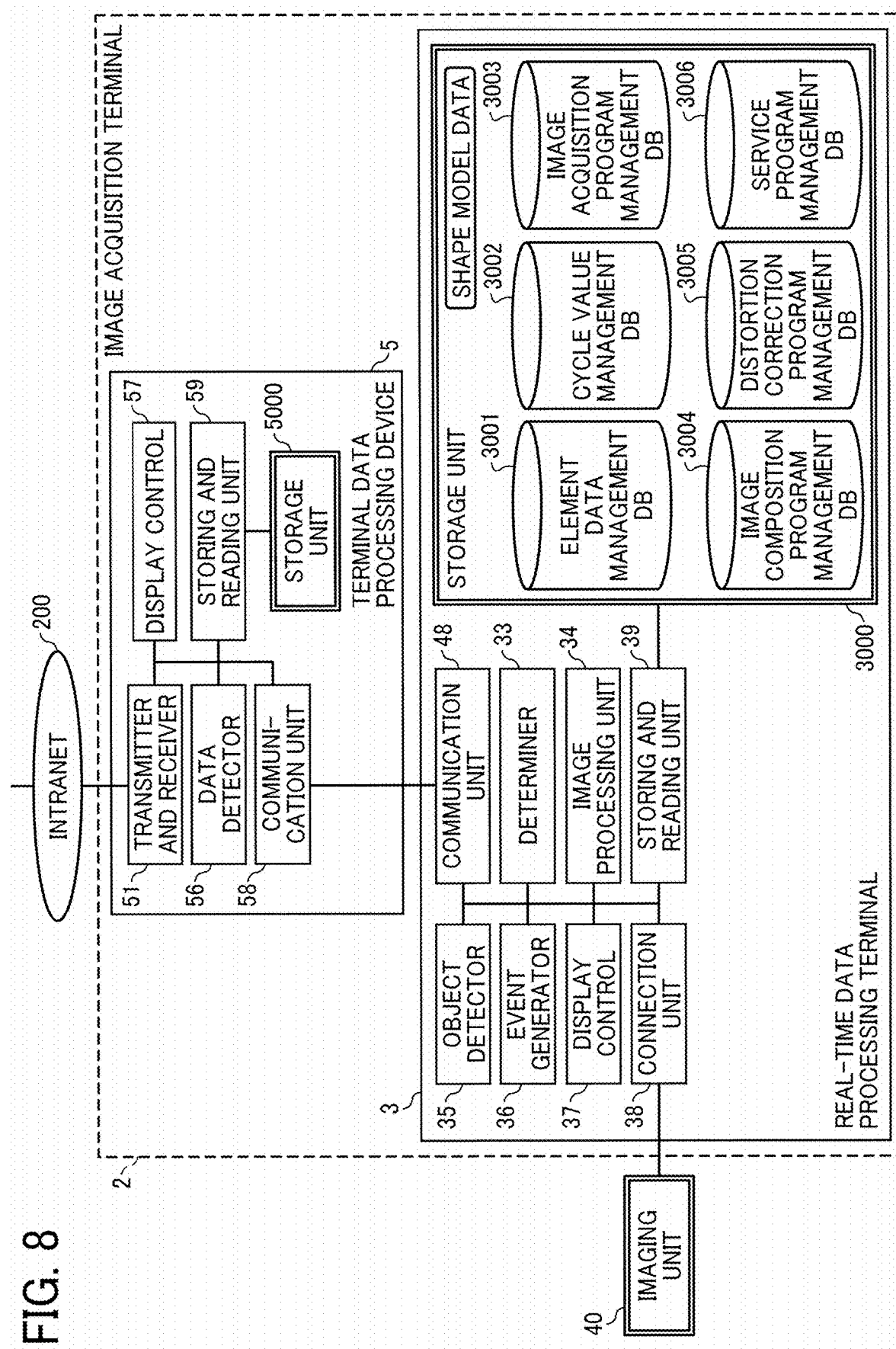
FIG. 8 is a schematic block diagram illustrating a functional configuration of the communication system of FIG. 1, specifically, the image acquisition terminal, according to the embodiment.
Figure 9:
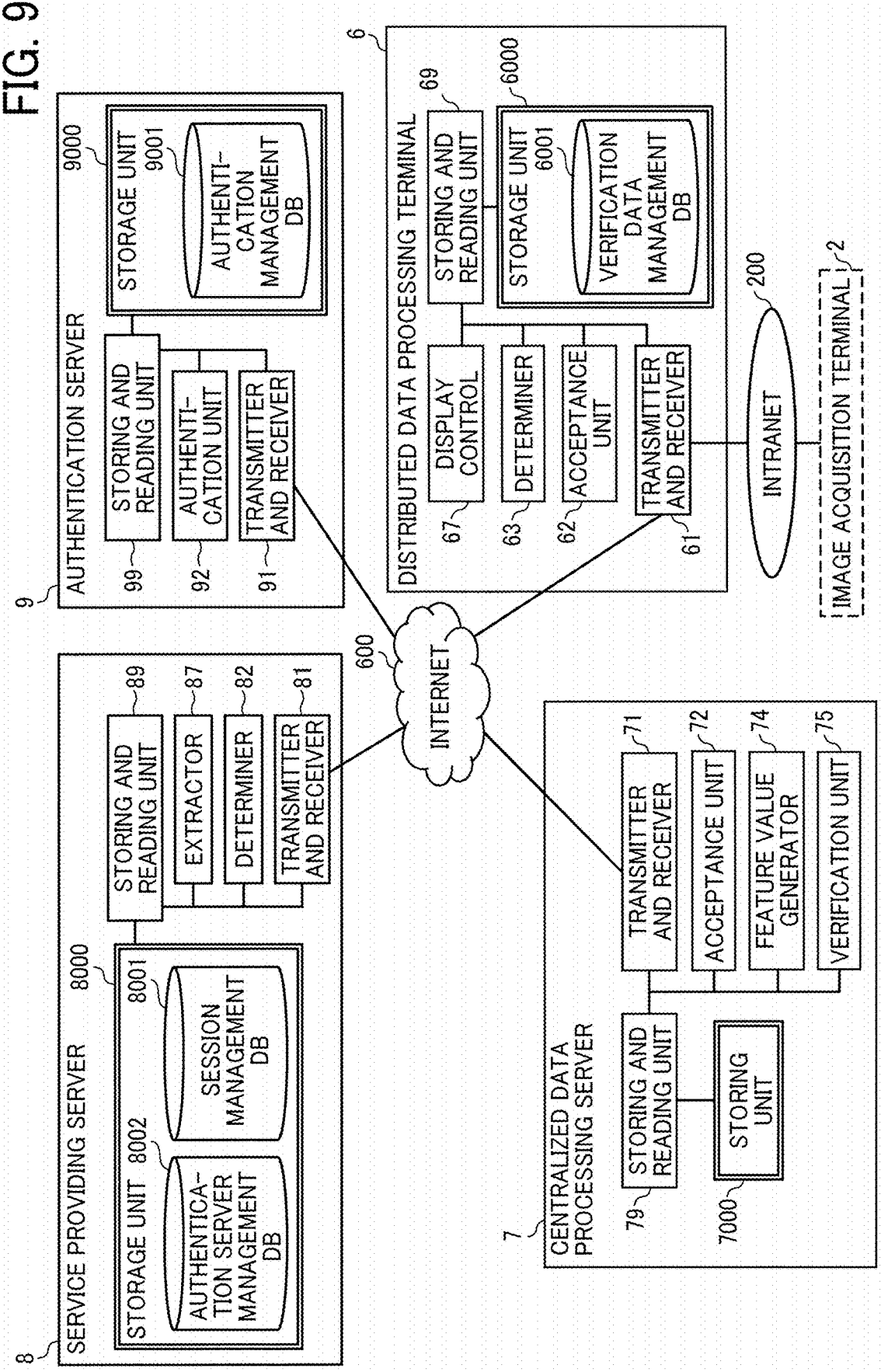
FIG. 9 is a schematic diagram illustrating a functional configuration of the communication system of FIG. 1, specifically, the service providing server, authentication server, distributed data processing terminal, and centralized data processing server, according to the embodiment.

First, referring to FIG. 8 to FIG. 16, functional configurations of terminals, apparatuses, and servers in the communication system 1 are described, according to the embodiment. FIGS. 8 and 9 are a schematic block diagram illustrating a functional configuration of the communication system 1 according to embodiments. FIG. 8 specifically illustrates a functional configuration of the image acquisition terminal 2 in the communication system 1.

<Functional Configuration of Real-Time Data Processing Terminal>

Referring to FIG. 8, the real-time data processing terminal 3 includes a determiner 33, an image processing unit 34, an object detector 35, an event generator 36, a display control 37, a connection unit 38, a storing and reading unit 39, and a communication unit 48. These units are functions that are implemented by or that are caused to function by operating any of the hardware components illustrated in FIG. 2 in cooperation with the instructions of the CPU 301 according to the control program expanded from the EEPROM 304 to the RAM 303.

The real-time data processing terminal 3 further includes a storage unit 3000, which is implemented by the ROM 302, the RAM 303, and/or the EEPROM 304 illustrated in FIG. 2. The storage unit 3000 stores therein shape model data, which is described below. The storage unit 3000 further stores an imaging element data management DB 3001, a cycle value management DB 3002, an image acquisition program management DB 3003, an image composition program management DB 3004, a distortion correction program management DB 3005, and a service program management DB 3006.

The imaging element data management DB 3001 is implemented by an imaging element data management table, which is described below referring to FIG. 10A. The cycle value management DB 3002 is implemented by a cycle value management table, which is described below referring to FIG. 10B. The image acquisition program management DB 3003 is implemented by an image acquisition program management table, which is described below referring to FIG. 11A. The image composition program management DB 3004 is implemented by an image composition program management table, which is described below referring to FIG. 11B. The distortion correction program management DB 3005 is implemented by a distortion correction program management table, which is described below referring to FIG. 11C. The service program management DB 3006 is implemented by a service program management table, which is described below referring to FIG. 11D.

(Imaging Element Data Management Table)

FIG. 10A is a conceptual diagram of an example of imaging element data management table. The imaging element data management table stores, for each one or more types of imaging unit 40, a model number of the imaging unit 40, the number of imaging elements included in the imaging unit 40, and a type of one or more lenses in the imaging unit 40, in association with one another. The model number is an example of type information indicating a type of the imaging unit 40 that is determined by the difference in number of imaging elements or type of lenses. In alternative to the model number, an identifier of the imaging unit 40 such as a product number, a bar code, etc. may be used, as long as such identifier is able to determine a number of imaging elements and/or a lens type of the imaging unit 40.

(Cycle Value Management Table)

FIG. 10B is a conceptual diagram illustrating an example of cycle value management table. The cycle value management table stores a number of imaging elements in the imaging unit 40 and a cycle value (frames per second) indicating a cycle time of the object recognition process, which will be described later, in association.

The tables of FIGS. 11A to 11C are each used for managing whether or not an appropriate program is installed in the real-time data processing terminal 3, depending on a model number of the real-time data processing terminal 3.

(Image Acquisition Program Management Table)

FIG. 11A is a conceptual diagram of an example of image acquisition program management table. The image acquisition program management table stores a number of imaging elements in the imaging unit 40 and an identifier of an image acquisition program (such as a name) to be installed in the real-time data processing terminal 3 to process data of the imaging unit 40 having a specific number of imaging elements, in association with flag information indicating whether that image acquisition program is installed ("install" field). For example, in case an image acquisition program is installed in the real-time data processing terminal 3 for processing data of the imaging unit 40 having one imaging element, the program name "ProgC01 (1 system)" and the flag information "1" are stored in association with the number of imaging elements "1". Similarly, in case an image acquisition program is installed in the real-time data processing terminal 3 for processing data of the imaging unit 40 having two imaging elements, the program name "ProgC02 (2 systems)" and the flag information "1" are stored in association with the number of imaging elements "2". In case no program is installed, the program name and the flag information "0" indicating that program is not installed are stored in association with the number of imaging elements.

(Image Composition Program Management Table)

FIG. 11B is a conceptual diagram illustrating an example of image composition program management table. The image composition program management table stores a number of imaging elements in the imaging unit 40 and an identifier of an image composition program (such as a name) to be installed in the real-time data processing terminal 3 to process data of the imaging unit 40 having a specific number of imaging elements, in association with flag information indicating whether the image composition program is installed ("install" field). For example, in case an image composition program is installed in the real-time data processing terminal 3 for processing data of the imaging unit 40 having a single imaging element, the program name "ProgS01 (image composition)" and the flag information "1" are stored in association with the number of imaging element "1". For instance, the program identified with "ProgS01 (image composition)" is used to combine images, which are sequentially obtained using the one imaging unit. Similarly, in case an image composition program is installed in the real-time data processing terminal 3 for processing data of the imaging unit 40 having two imaging elements, the program name "ProgS02 (image composition)" and the flag information "1" are stored in association with the number of imaging elements "2". In case no program is installed, the program name and the flag information "0" indicating that program is not installed are stored in association with the number of imaging elements. In alternative example, since composition (combining) of images is not necessary for the imaging unit 40 with one imaging element, no program name may be managed.

(Distortion Correction Program Management Table)

FIG. 11C is a conceptual diagram illustrating an example of distortion correction program management table. The distortion correction program management table stores a type of the lens in the imaging unit 40 and an identifier of the distortion correction program (such as the name) to be installed in the real-time data processing terminal 3 to process data of the imaging unit 40 having a specific lens type, in association with flag information indicating whether the distortion correction program is installed ("install" field). For example, in case a distortion correction program is installed in the real-time data processing terminal 3 for processing data of the imaging unit 40 having the wide-angle lens, the program name "ProgW01 (wide-angle correction)" and the flag information "1" are stored in association with the lens type "wide-angle lens". Similarly, in case a distortion correction program is installed in the real-time data processing terminal 3 for processing data of the imaging unit 40 having the fish-eye lens, the program name "ProgW02 (fish-eye correction)" and the flag information "1" are stored in association with the lens type "fish-eye lens". In case no program is installed, the program name and the flag information "0" indicating that program is not installed are stored in association with the type of imaging elements.

(Service Program Management Table)

FIG. 11D is a conceptual diagram illustrating an example of service program management table. The table of FIG. 11D is used for determining whether a specific program is installed at the image acquisition terminal 2 (in this case, the real-time data processing terminal 3) to perform a specific service, based on authentication of the image acquisition terminal 2 (or the user operating the image acquisition terminal 2) by the authentication server 9. The service program management table stores an authentication server ID for identifying an authentication server for providing a specific service and an identifier (such as a name of the program) of a service program for providing the specific service to the image acquisition terminal 2, in association with flag information indicating whether the service program is installed ("install" field). For example, in case an object detection program is installed in the real-time data processing terminal 3, which is authenticated by the authentication server for providing an object detection service, the program name "Prog D01 (object detection)" and the flag information "1" are stored in association with the authentication server ID "a01" of the authentication server providing the object detection service. Similarly, in case an object counting program is installed in the real-time data processing terminal 3, which is authenticated by the authentication server for providing an object counting service, the program name "Prog D02 (object counting)" and the flag information "1" are stored in association with the authentication server ID "a02" of the authentication server providing the object counting service. In case no program is installed, the program name and the flag information "0" indicating that program is not installed are stored in association with the authentication server ID.

As described above, some application programs, like the programs described above referring to FIGS. 11A to 11C, are installed at the image acquisition terminal 2, for example, when an imaging unit 40 is newly detected or the image acquisition terminal 2 is newly registered to a system. Once such application programs are installed, authentication of the user using the image acquisition terminal 2 (or the distributed data processing terminal 6 that manages the image acquisition terminal 2) to use such application programs is not necessary, as none of these application programs referring to FIGS. 11A to 11C handles information that can identify a user.

On the other hand, some application programs, like the programs described above referring to FIG. 11D, are installed at the image acquisition terminal 2 when a specific service related to identification of a user is requested. Even when such application programs are installed based on authentication, authentication of user using the image acquisition terminal 2 (or the distributed data processing terminal 6 that manages the image acquisition terminal 2) to use such application programs is necessary, as these application programs referring to FIG. 11D handles user-specific information that can identify a user, such as a facial image of the user and a name of the user.

While it is possible that the communication system 1 allows the image acquisition terminal 2 to execute various types of application programs only when the image acquisition terminal 2 is authenticated as an authorized terminal, performing authentication processing for each of the application programs to be executed is cumbersome, resulting in the increase in processing load. This may result in delay in overall processing, which is not desirable especially for the communication system 1 that may be used to detect a suspicious person in which real-time data processing is preferable.

In view of this, the communication system 1 described in this disclosure performs authentication processing only for the application programs that are previously determined as authentication processing is needed, such as the application programs that handle user-specific information. Accordingly, processing of image data, which is acquired at the image acquisition terminal 2, is performed in real time, while still maintaining the security level.

(Functional Configuration of Real-Time Data Processing Terminal)

Referring to FIG. 8, a functional configuration of the real-time data processing terminal 3 is described according to the embodiment.

The determiner 33, which is implemented by instructions of the CPU 301, performs various determinations. For example, the determiner 33 refers to the imaging element data management DB 3001 to determine a number of imaging elements or a lens type of the imaging unit 40 having the model type sent from the imaging unit 40.

The image processing unit 34, which is implemented by the instructions of the CPU 301, performs various types of image processing according to one or more programs (image acquisition program, image composition program, distortion correction program, and service program), which are managed using the tables described above referring to FIGS. 11A to 11D. More specifically, the image processing unit 34 executes a first program (for example, an image acquisition program, an image composition program, and a distortion correction program) that does not require authentication for obtaining, to apply first image processing (for example, image acquisition, image composition, and distortion correction) to image data such as captured image data. The image processing unit 34 further executes a second program (for example, a service program) that requires authentication for obtaining, to apply second image processing (for example, an object detection, an object counting) to image data such as captured image data.

The captured image data to be applied with image processing, contains a detection target as described above. For example, the object detector 35, which is implemented by instructions of the CPU 301, detects feature points as a candidate for a specific object such as a human face in the captured image, and refers to the shape model data indicating a shape model of the specific object (such as the human face) to detect the coordinates of the specific object in the captured image. Any desired known method may be used to detect the specific object.

The event generator 36, which is implemented by the instructions of the CPU 301, generates detection data (event data) indicating detection of a specific object, for example, when the coordinates of a specific object are specified by the object detector 35.

The display control 37, which is implemented by the instructions of the CPU 301, controls the display 317 to display various screens.

The connection unit 38, which is implemented by the imaging unit I/F 313 and the instructions of the CPU 301, is an interface for mechanically and electrically connecting the imaging unit 40 to the real-time data processing terminal 3.

The storing and reading unit 39, which is implemented by instructions of the CPU 301, stores various data or information in the storage unit 3000 or reads out various data or information from the storage unit 3000.

The communication unit 48, which may be implemented by the instructions of the CPU 301 and the external device connection I/F 318, transmits or receives various data (or information) to or from the communication unit 58 of the terminal data processing device 5. The one-to-one communication between the communication unit 48 and the communication unit 58 may be performed via a wired network or a wireless network.

<Functional Configuration of Terminal Data Processing Device>

As illustrated in FIG. 8, the terminal data processing device 5 includes a transmitter and receiver 51, a data detector 56, a display control 57, a communication unit 58, and a storing and reading unit 59. These units are functions that are implemented by or that are caused to function by operating any of the elements illustrated in FIG. 5 in cooperation with the instructions of the CPU 501 according to the control program expanded from the EEPROM 504 to the RAM 503.

The terminal data processing device 5 further includes a storage unit 5000, which is implemented by the ROM 502, RAM 503 and EEPROM 504 illustrated in FIG. 5.

(Functional Configuration of Terminal Data Processing Device)

Referring to FIG. 8, a functional configuration of the terminal data processing device 5 is described according to the embodiment.

The transmitter and receiver 51 of the terminal data processing device 5, which is implemented by the far-distance communication circuit 511, the antenna 511a, and the instructions of the CPU 501, transmits or receives various data (or information) to or from the distributed data processing terminal 6 via a communication network (the intranet 200).

The data detector 56, which is implemented by the instructions of the CPU 501, detects whether or not an event has occurred that triggers reception of data from the real-time data processing terminal 3, and whether or not the reception of data is completed.

The display control 57, which is implemented by the instructions of the CPU 501, controls the display 517 to display various screens.

The communication unit 58, which may be implemented by the instructions of the CPU 501 and the external device connection I/F 518, transmits or receives various data (or information) to or from the communication unit 48 of the real-time data processing terminal 3. The one-to-one communication between the communication unit 58 and the communication unit 48 may be performed via a wired network or a wireless network.

The storing and reading unit 59, which is implemented by instructions of the CPU 501, stores various data or information in the storage unit 5000 or reads out various data or information from the storage unit 5000.

<Functional Configuration of Distributed Data Processing Terminal>

As illustrated in FIG. 9, the distributed data processing terminal 6 includes a transmitter and receiver 61, an acceptance unit 62, a determiner 63, a display control 67, and a storing and reading unit 69. These units are functions that are implemented by or that are caused to function by operating any of the elements illustrated in FIG. 5 in cooperation with the instructions of the CPU 501 according to the control program expanded from the EEPROM 504 to the RAM 503 in the distributed data processing terminal 6.

The distributed data processing terminal 6 further includes a storage unit 6000, which is implemented by the ROM 502, RAM 503 and EEPROM 504 illustrated in FIG. 5. The storage unit 6000 stores verification data. The storage unit 6000 further stores a verification data management DB 6001. The verification data management DB 6001 is implemented by a verification data management table, which will be described below referring to FIG. 12. The verification data may be stored in a memory of any data management server other than the distributed data processing terminal 6.

(Verification Data Management Table)

FIG. 12 is a conceptual diagram illustrating the verification data management table according to the embodiment. The verification data management table stores, for each one of a plurality of persons (or objects) to be verified, a file name of an image file (such as a facial image) as the verification data and a name of a person identified with a facial image. In addition to the data items illustrated in FIG. 12, the verification data management table may store any other data such as a verification result, and feature values parameters of an image.

For the file name of verification data, in one embodiment (See FIG. 28), the verification data management table illustrated in FIG. 12 stores a file name of any image file of partial image data to be compared for verification. The name of a person identified with a facial image may not be stored. Further, the verification data management table of FIG. 12 may not be provided for the embodiment described below referring to FIG. 28.

In another embodiment (See FIG. 30), the verification data management table illustrated in FIG. 12 stores a file name of an image file of partial image data used for verification.

For the verification result, the verification result indicating whether verification is successful or fails, may be stored, which is obtained from the response from the centralized data processing server 7.

Further, while the name of the person corresponding to the verification data is stored, any other type of data may be used as identification information of the person, such as a user ID. Alternatively, a name of the object, other than the person, may be used in case the object is not a human. For example, if the object is a car, aircraft, train, or any goods, a name of such object or an ID (such as an ID code) of such object may be stored. Further, such identification information may be obtained from the centralized data processing server 7.

(Functional Configuration of Distributed Data Processing Terminal)

The transmitter and receiver 61 of the distributed data processing terminal 6, which is implemented by the far-distance communication circuit 511, the antenna 511*a*, and the instructions of the CPU 501, transmits or receives various data (or information) to or from the centralized data processing server 7 via a communication network (the Internet 600). For example, the transmitter and receiver 61 transmits a verification request for verifying the data to be verified using the verification data, to the centralized data processing server 7, or performs processing on the verification result sent from the centralized data processing server 7. The transmitter and receiver 61 transmits or receives various data (or information), such as the data to be verified, to or from the image acquisition terminal 2 via the communication network (such as the intranet 200).

The acceptance unit 62 is implement by the touch panel 521 of the distributed data processing terminal 6, which operates under control of the CPU 501, to receive various selections or inputs from the user.

The determiner 63, which is implemented by instructions of the CPU 501 of the distributed data processing terminal 6, performs various determinations.

The display control 67, which is implemented by the instructions of the CPU 501 of the distributed data processing terminal 6, controls the display 517 to display various screens.

The storing and reading unit 69, which is implemented by instructions of the CPU 501 of the distributed data processing terminal 6, stores various data or information in the storage unit 6000 or reads out various data or information from the storage unit 6000. For example, the storing and reading unit 69 stores the verification data (in this case, the facial image data) in the storage unit 6000 according to a registration request received at the acceptance unit 62. The storing and reading unit 69 may store verification data and target data to be verified, in the storage unit 6000 (verification data management DB 6001).

<Functional Configuration of Centralized Data Processing Server>

As illustrated in FIG. 9, the centralized data processing server 7 includes a transmitter and receiver 71, an acceptance unit 72, a feature value generator 74, a verification unit 75, and a storing and reading unit 79. These units are functions that are implemented by or that are caused to function by operating any of the elements illustrated in FIG. 6 in cooperation with the instructions of the CPU 701 according to the control program expanded from the HD 704 to the RAM 703 in the centralized data processing server 7.

The centralized data processing server 7 further includes a storage unit 7000, which is implemented by the ROM 702, the RAM 703 and the HD 704 illustrated in FIG. 6. The storage unit 7000 stores feature value data to be used for verification, which will be described below, and a name or an identification code of the object having the feature values.

(Functional Configuration of Centralized Data Processing Server)

The transmitter and receiver 71 of the centralized data processing server 7, which is implemented by the network I/F 709 and the instructions of the CPU 701, transmits or receives various data (or information) to or from the distributed data processing terminal 6 via a communication network (the Internet 600). For example, the transmitter and receiver 71 receives a verification request for verifying the data to be verified using the verification data, from the distributed data processing terminal 6, or sends the verification result including similarity to the distributed data processing terminal 6.

The acceptance unit 72 is implemented by the keyboard 711 or mouse 712, which operates under control of the CPU 701, to receive various selections or inputs from the user.

The feature value generator 74, which is implemented by the instructions of the CPU 701, generates parameters of feature values from the data to be verified (partial image data) and the verification data that are received at the transmitter and receiver 71.

The verification unit 75, which is implemented by the instructions of the CPU 701, compares the feature values between the verification data and the data to be verified, using the feature values obtained at the feature value generator 74, to calculate a score (in points) indicating the similarity in feature values.

The storing and reading unit 79, which is implemented by the instructions of the CPU 701, stores various data or information in the storage unit 7000 or reads out various data or information from the storage unit 7000.

<Functional Configuration of Service Providing Server>

Next, referring to FIGS. 9, 13 to 15, each functional unit of the service providing server 8 is described in detail. As illustrated in FIG. 9, the service providing server 8 includes a transmitter and receiver 81, a determiner 82, an extractor 87, and a storing and reading unit 89. These units are functions that are implemented by or that are caused to function by operating any of the elements illustrated in FIG. 6 in cooperation with the instructions of the CPU 701 according to the service providing program expanded from the HD 704 to the RAM 703.

The service providing server 8 further includes a storage unit 8000, which is implemented by the RAM 703 and the HD 704 illustrated in FIG. 6. The storage unit 8000 stores various data transmitted from the distributed data processing terminal 6 or the authentication server 9. The storage unit 8000 stores all of the programs, which is determined according to the tables referring to FIGS. 11A to 11D. In response to a request from the real-time data processing terminal 3, the service providing server 8 transmits the requested program for installation to the real-time data processing terminal 3.

The storage unit 8000 further includes a session management DB 8001 and an authentication server management DB 8002. The session management DB 8001 is implemented by a session management table, which is described below referring to FIG. 13. The authentication server management DB 8002 is implemented by an authentication server management table, which is described below referring to FIG. 15. Each table will be described in detail below.

(Session Management Table)

FIG. 13 is a conceptual diagram of an example of session management table. The session management table of FIG. 13 manages a session to be used for providing various types of services (that is, various types of programs for executing the services) to the distributed data processing terminal 6 managing the image acquisition terminal 2. The session management table stores a session ID for identifying a communication session established with the distributed data processing terminal 6, a terminal ID for identifying the distributed data processing terminal 6, and an IP address of the distributed data processing terminal 6 operated by the user identified with the terminal ID, in association. Here, the terminal ID may be any identifier for identifying the user operating the distributed data processing terminal 6, or the distributed data processing terminal 6 itself. In the following example, the terminal ID includes a user ID identifying the user operating the distributed data processing terminal 6.

Figure 14A:
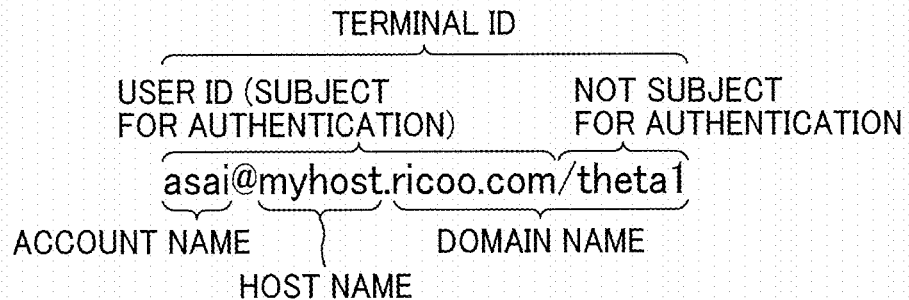
FIGS. 14A, 14B, and 14C are each a conceptual diagram illustrating an example of terminal identifier.
Figure 14B:
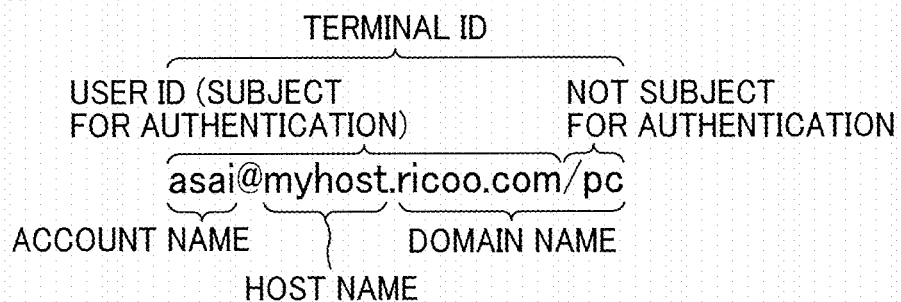
Figure 14C:
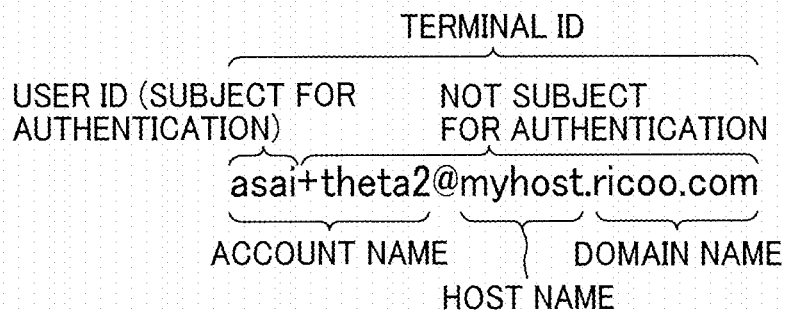

FIGS. 14A, 14B, and 14C each illustrate an email address as an example of the terminal ID, which can be classified into a part to be authenticated (subject for authentication) and a part not to be authenticated (not subject for authentication). More specifically, in the following examples, the email address, as an example of the terminal ID, includes a user ID. A part or entire user ID is used for authentication. The part subject for authentication is a user ID to be used for authentication by the authentication server 9. The part not subject for authentication is any part other than the user ID, which is not to be used for authentication by the authentication server 9.

Referring to a first example case of FIG. 14A, the part subject for authentication includes an account name "asai", a host name "myhost" and a domain name "ricoo.com". The part not subject or authentication includes "theta1", which is any remaining part of the email address. In such case, the extractor 87 distinguishes between the part subject for authentication and the part not subject for authentication by "|".

The email address of FIG. 14B can be classified into the part subject for authentication and the part not subject for authentication, similar to that of FIG. 14A, except that the part not subject for authentication differs. Specifically, the authentication server 9 recognizes that the terminal ID of FIG. 14B is the same as that of FIG. 14A, as the part subject for authentication is the same, even when the part not subject for authentication differs.

Alternatively, the terminal ID may be authenticated according to a second example case illustrated in FIG. 14C. Referring to the second example case of FIG. 14C, the part subject for authentication includes a front part of an account name, that is, "asai". The part not subject for authentication includes "theta2", which is any remaining part of the account name, and a host name "myhost", and a domain name "ricoo.com". In such case, the extractor 87 distinguishes between the part subject for authentication and the part not subject for authentication by "+".

(Authentication Server Management Table)

FIG. 15 is a conceptual diagram of an example of authentication server management table. The authentication server management table stores, for each authentication server 9, an authentication server ID identifying the authentication server 9 and a URL (Uniform Resource Locator) for accessing the authentication server 9 in association.

(Each Functional Unit of Service Providing Server)

Next, referring to FIG. 9, each functional unit of the service providing server 8 is described in detail.

The transmitter and receiver 81 of the service providing server 8, which may be implemented by the instructions from the CPU 701, and the network I/F 709, illustrated in FIG. 6, transmits or receives various data (or information) to or from the distributed data processing terminal 6 or the authentication server 9 through the communication network (such as the Internet 600).

The determiner 82, which is implemented by instructions from the CPU 701 illustrated in FIG. 6, determines, for example, whether or not a communication session for providing a service to the distributed data processing terminal 6 has already been established.

The extractor 87, which is implemented by instructions from the CPU 701 illustrated in FIG. 6, extracts a user ID (part subject for authentication) from the terminal ID as illustrated in FIGS. 14A to 14C.

The storing and reading unit 39, which is implemented by instructions from the CPU 701 and the HDD 705, illustrated in FIG. 6, stores various data or information in the storage unit 8000 or reads out various data or information from the storage unit 8000.

<Functional Configuration of Authentication Server>

Next, referring to FIGS. 9 and 16A to 16C, each functional unit of the authentication server 9 is described in detail. The authentication server 9 includes a transmitter and receiver 91, an authentication unit 92, and a storing and reading unit 99. These units are functions that are implemented by or that are caused to function by operating any of the elements illustrated in FIG. 6 in cooperation with the instructions of the CPU 701 according to the authentication server program expanded from the HD 704 to the RAM 703.

The authentication server 9 further includes a storage unit 9000, which is implemented by the RAM 703 and the HD 704 illustrated in FIG. 6. The storage unit 9000 stores various data transmitted from the distributed data processing terminal 6 or the service providing server 8.

The storage unit 9000 further stores an authentication management DB 9001. The authentication management DB 9001 is implemented by an authentication management table, which is described below. The authentication management table will be described in detail below.

(Authentication Management Table)

FIG. 16A is a conceptual diagram of an example of authentication management table stored in the authentication server 9a. FIG. 16B is a conceptual diagram of an example of authentication management table stored in the authentication server 9b. 16C is a conceptual diagram of an example of authentication management table stored in the authentication server 9c.

The authentication management table stores, for each user being managed, a user ID (the part subject for authentication) for identifying the user, and a password, in association. In this example, the user ID is a part of the terminal ID, which is subject for authentication, as described above referring to FIGS. 14A to 14C. The password is previously set by the user identified with the user ID.

(Each Functional Unit of Authentication Server)

Next, referring to FIG. 9, each functional unit of the authentication server 9 is described in detail.

The transmitter and receiver 91 of the authentication server 9, which is implemented by the instructions from the CPU 701 and the network I/F 709, transmits or receives various data (or information) to or from the distributed data processing terminal 6 and the service providing server 8 via the communication network (the Internet 600).

The authentication unit 92, which is implemented by the instructions from the CPU 701 illustrated in FIG. 6, authenticates the ID (such as the terminal ID) of the distributed data processing terminal 6, based on a determination of whether or not the image acquisition terminal 2 that has transmitted the authentication request has an authority to receive a service. Such authentication is performed because the distributed data processing terminal 6 manages the image acquisition terminal 2. That is, in one example, the distributed data processing terminal 6 manages a plurality of image acquisition terminals 2, which may be distributed over different places, but within a same local area. In such case, the user (usually, the operator) of the distributed data processing terminal 6 is given an authorization to install or use some application programs (that is, services) that require authentication.

The storing and reading unit 99, which is implemented by the instructions of the CPU 701 and the HDD 705, illustrated in FIG. 6, stores various data or information in the storage unit 9000 or reads out various data or information from the storage unit 9000.

<<Operation>>

Referring now to FIGS. 17 to 29, operation performed by the communication system 1 is described according to the embodiment.

<Authentication Processing>

Figure 17:
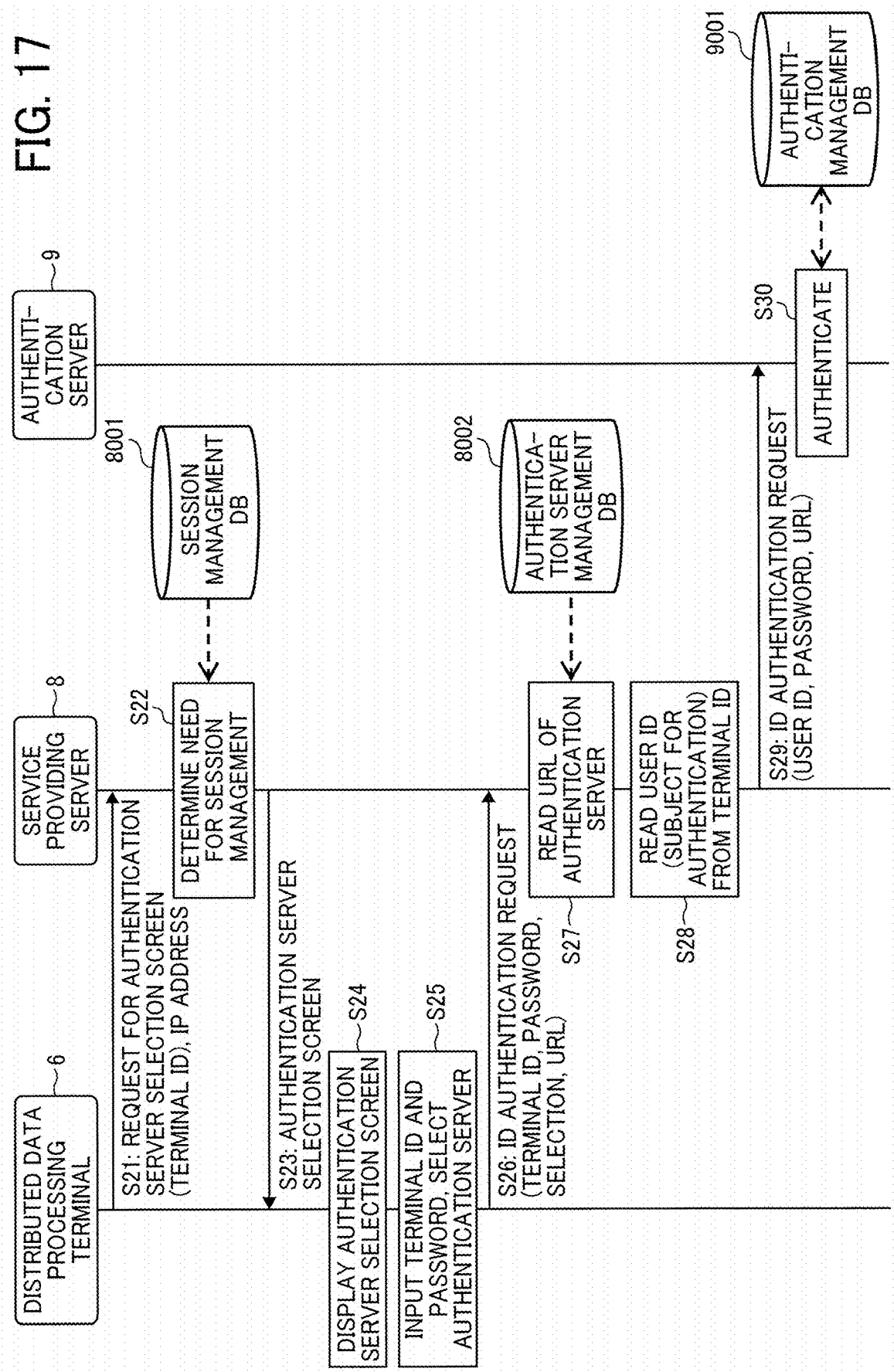
FIG. 17 is a sequence diagram illustrating authentication processing, performed by the communication system of FIG. 1, according to an embodiment.
Figure 18:
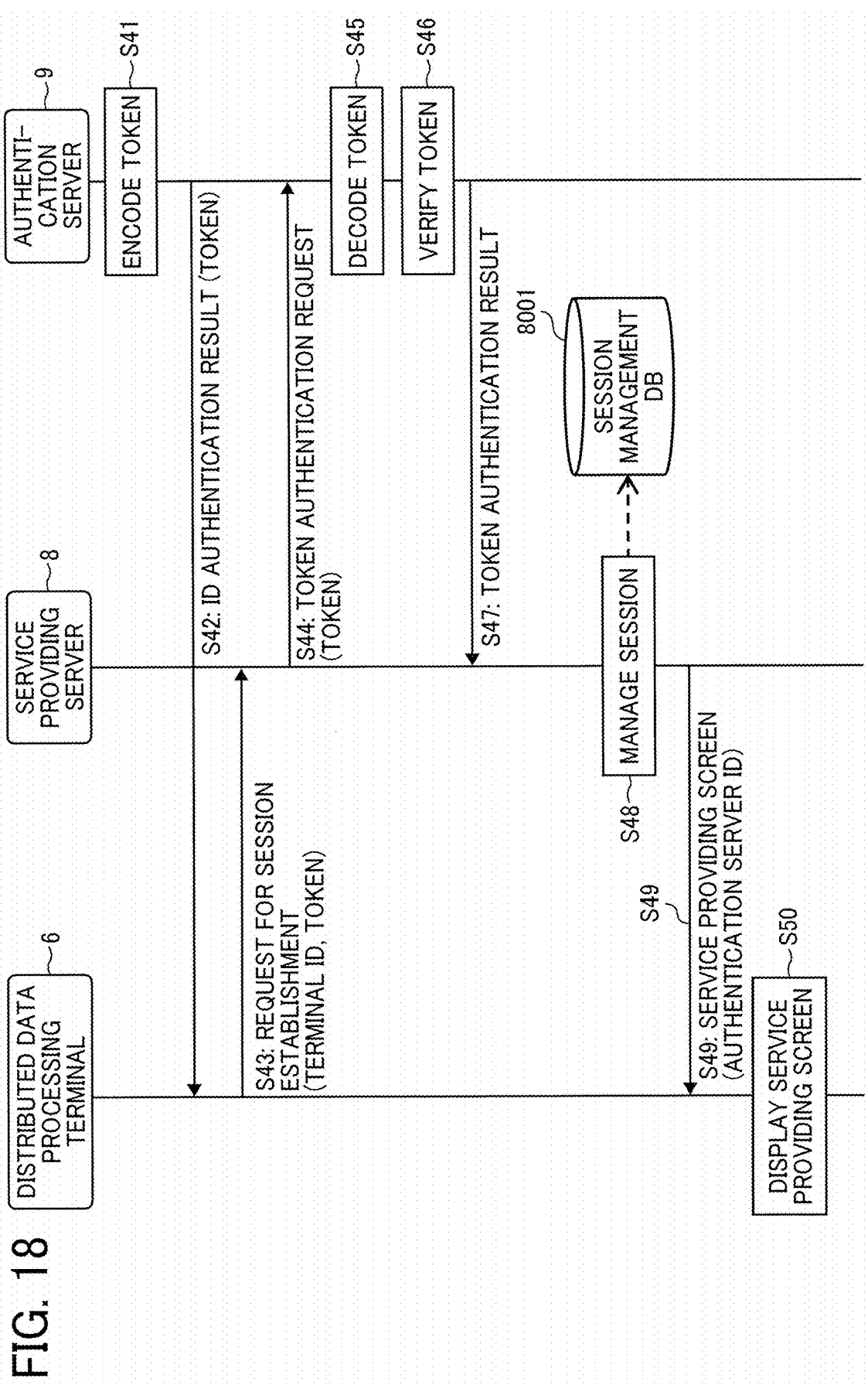
FIG. 18 is a sequence diagram illustrating authentication processing, performed by the communication system of FIG. 1 after processing of FIG. 17, according to the embodiment.
Figure 19:
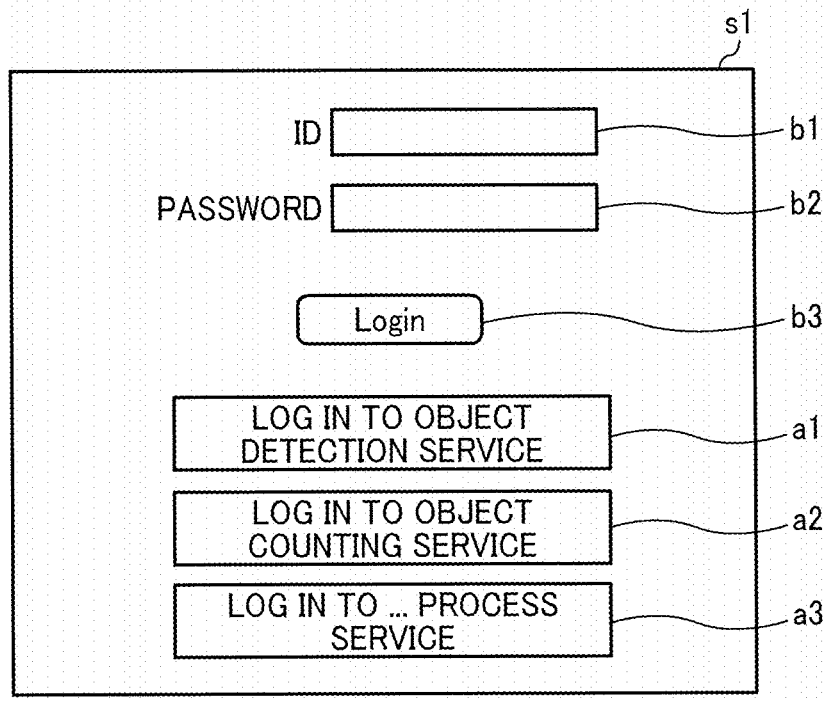
FIG. 19 is an example authentication server selection screen to be displayed at the distributed data processing terminal.
Figure 20:
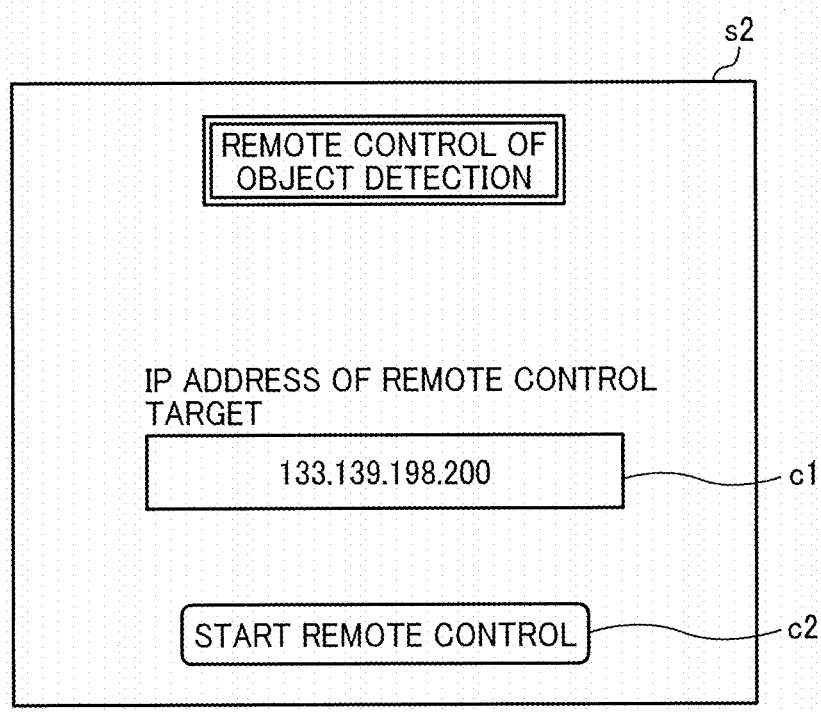
FIG. 20 is an example service providing screen to be displayed at the distributed data processing terminal.

First, authentication processing will be described with reference to FIGS. 17 to 20. FIGS. 17 and 18 are sequence diagrams illustrating authentication processing, performed by the communication system 1, according to the embodiment. FIG. 19 and FIG. 20 are diagrams illustrating examples of screens, displayed at the distributed data processing terminal 6.

As illustrated in FIG. 17, the transmitter and receiver 61 of the distributed data processing terminal 6 transmits a request for an authentication server selection screen to the service providing server 8 (S21). This authentication server selection screen request includes the terminal ID of the distributed data processing terminal 6. The transmitter and receiver 61 further transmits the IP address of the distributed data processing terminal 6, with the authentication server selection screen request. The transmitter and receiver 81 of the service providing server 8 receives the request for the authentication server selection screen and the IP address of the distributed data processing terminal 6.

Next, the determiner 82 of the service providing server 8 determines whether or not the terminal ID of the distributed data processing terminal 6 received at S21 is stored in association with a session ID in the session management table (FIG. 13) (S22). Hereinafter, the case where the terminal ID of the distributed data processing terminal 6 is not stored in association with the session ID will be described.

The transmitter and receiver 81 of the service providing server 8 transmits data of an authentication server selection screen to the distributed data processing terminal 6 (S23). The transmitter and receiver 61 of the distributed data processing terminal 6 receives the data of the authentication server selection screen.

Next, the display control 67 of the distributed data processing terminal 6 controls the display 517 to display an authentication server selection screen s1 as illustrated in FIG. 19 (S24). FIG. 19 illustrates an example of the authentication server selection screen s1, displayed at the distributed data processing terminal 6. The authentication server selection screen s1 includes an ID entry field b1, a password entry field b2, and a login button b3 for accepting a login request (authentication request). The authentication server selection screen s1 further includes a plurality of authentication server selection buttons a1, a2, and a3 for selecting the authentication servers 9a, 9b, and 9c, respectively. For example, the authentication server selection button a1 provides, when selected, a user with a service of object detection using the object detection program. The authentication server selection button a2 provides, when selected, a user with a service of object counting using the object counting program.

Here, the user inputs the terminal ID of the distributed data processing terminal 6 operated by the user in the ID entry field b1, and a password in the password entry field b2, as information to be used for authentication. As described above referring to FIGS. 14A to 14C, in this example, the email address of the user is used as the terminal ID. After entering the terminal ID and the password, the user presses a desired button from among the authentication server selection buttons a1, a2, and a3, and further presses the login button b3. The acceptance unit 62 accepts a selection of a specific service, indicated by the selected authentication server selection button (S25). The following describes an example case in which, in response to selection of the authentication server selection button a1, the service providing server 8 provides the object detection service according to the object detection program ProgD01.

The transmitter and receiver 61 transmits an ID authentication request for authenticating the ID (in this example, the terminal ID) of the distributed data processing terminal 6 to the service providing server 8 (S26). The ID authentication request includes the terminal ID and the password, and the selection result of the authentication server 9, received at S25, and the URL of the distributed data processing terminal 6. The selection result of the authentication server 9 indicates an authentication server ID for identifying the selected authentication server 9. The transmitter and receiver 81 of the service providing server 8 receives the ID authentication request.

Next, the storing and reading unit 89 of the service providing server 8 searches the authentication server management table (FIG. 15) using the authentication server ID, which is received at S26 as the selection result, as a search key, to read out the URL of the authentication server associated with the received authentication server ID (S27).

The extractor 87 extracts only the user ID (the part subject for authentication) out of the terminal ID received at S26 (S28). Then, the transmitter and receiver 81 transmits an ID authentication request to the authentication server 9 indicated by the URL read out at S27 (S29). The ID authentication request includes the user ID (the part subject for authentication) extracted at S28, the password received at S26, and the URL of the distributed data processing terminal 6 received at S26. Accordingly, the transmitter and receiver 71 of the authentication server 9 receives the ID authentication request, which is a request for authenticating the user of the distributed data processing terminal 6.

Next, the storing and reading unit 99 of the authentication server 9 searches the authentication management table (FIG. 16), using a pair of the user ID (the part subject for authentication) and the password received at S29 as a search key, to output a search result. Based on this search result indicating whether the same pair has been stored, the authentication unit 92 authenticates the ID of the distributed data processing terminal 6 (S30). When the same pair is stored, the authentication unit 92 determines that the distributed data processing terminal 6 is an authorized terminal allowed to receive a requested service from the service providing server 8. When the same pair is not stored, the authentication unit 92 determines that the distributed data processing terminal 6 is not an authorized terminal for receiving a requested service from the service providing server 8.

At S28, the extractor 87 extracts the part subject for authentication from the terminal ID, but it is not limited thereto. For example, the service providing server 8 does not have to be provided with the extractor 87. In such case, at S29, the transmitter and receiver 81 may transmit only the user ID (the part subjected for authentication) out of the terminal ID, in addition to the password and the URL. While a part of the user ID may not be recognized without the extractor 87, as long as the user ID is recognized and sent to the authentication server 9, the authentication server 9 is able to authenticate the user at the distributed data processing terminal 6. For example, the authentication server 9 may be provided with the extractor 87 to extract the part subjected for authentication, from the user ID that is received. More specifically, in one example, the distributed data processing terminal 6 may extract the part subjected to authentication from the terminal ID in prior to S26. In such case, at S26, the user ID (the part subjected to authentication) is sent. Alternatively, the authentication server 9 may extract, from the terminal ID, the part subjected to authentication after S29. In such case, the terminal ID is transmitted at S29, rather than the user ID (the part subjected to authentication).

Subsequently, as illustrated in FIG. 18, the authentication unit 92 of the authentication server 9 encodes a token (transmission right) (S41). The transmitter and receiver 91 of the authentication server 9 transmits an ID authentication result to the distributed data processing terminal 6, using the URL of the distributed data processing terminal 6 received at S29 (S42). The ID authentication result indicates whether or not the distributed data processing terminal 6 is an authorized terminal, and further includes the token encoded at S41 when the distributed data processing terminal 6 is an authorized terminal. When the distributed data processing terminal 6 is not an authorized terminal, the ID authentication result includes an error message. Accordingly, the transmitter and receiver 61 of the distributed data processing terminal 6 receives the ID authentication result indicating whether the distributed data processing terminal 6 is an authorized terminal, that is, whether the user is authorized to use the requested service. The following describes an example case in which the user is determined to be the authorized user.

The transmitter and receiver 61 of the distributed data processing terminal 6 transmits a request for establishing a session to the service providing server 8 (S43). This session establishment request includes the terminal ID, which is authenticated, and the encoded token received at S42. Accordingly, the transmitter and receiver 81 of the service providing server 8 receives the session establishment request.

Next, to confirm that the distributed data processing terminal 6 that transmitted the session establishment request has been determined to be a terminal operated by the authorized user at S30, the service providing server 8 transmits a token authentication request to the authentication server 9 (S44). The token authentication request includes the encoded token received at S43. Accordingly, the transmitter and receiver 91 of the authentication server 9 receives the token authentication request.

Next, the authentication unit 92 decodes the encoded token received at S44 (S45). The authentication unit 92 authenticates the token by comparing the token before encoding at S41 with the token after decoding at S45 (S46). Then, the transmitter and receiver 91 of the authentication server 9 transmits the token authentication result of S46 to the service providing server 8 (S47). Accordingly, the transmitter and receiver 81 of the service providing server 8 receives the token authentication result. The following illustrates the example case in which the token is authenticated at S46.

Next, the storing and reading unit 89 of the service providing server 8 newly assigns a session ID to a session being established with the distributed data processing terminal 6, and stores in the session management table (FIG. 13) the terminal ID and the IP address of the distributed data processing terminal 6, received at S21, in association with the newly-assigned session ID (S48). The transmitter and receiver 81 transmits data of a service providing screen to the distributed data processing terminal 6 through the established session (S49). The transmitter and receiver 81 further transmits an authentication server ID of the authentication server 9, and the session ID generated at S48. Accordingly, the transmitter and receiver 61 of the distributed data processing terminal 6 receives the data of the service providing screen, the authentication server ID, and the session ID.

Next, the display control 67 of the distributed data processing terminal 6 controls the display 517 to display the service providing screen s2 as illustrated in FIG. 20 (S50). FIG. 20 illustrates an example of the service providing screen s2 displayed at the distributed data processing terminal 6. The service providing screen s2 requests the user to enter a detection target. As described above, in this example, it is assumed that more than one image acquisition terminal 2 is provided under management of the distributed data processing terminal 6. The user at the distributed data processing terminal 6 selects at least one image acquisition terminal 2, as a detection target.

The following describes an example case in which a remote operation service is provided as an example service, which remotely controls the image acquisition terminal 2 from the distributed data processing terminal 6. The service providing screen s2 illustrated in FIG. 20 includes an entry field c1 for an IP address for identifying a remote-control target, and a "remote control start" button c2. In this example, the IP address for identifying an address of the image acquisition terminal 2 is input as the IP address for identifying the remote control target. Alternatively, the distributed data processing terminal 6 may set the image acquisition terminal 2 as a remote control target, by a terminal ID of the image acquisition terminal 2 entered by a user, or by a connection address (other than the IP address) of the image acquisition terminal 2 stored in the distributed data processing terminal 6.

As described above, more than one image acquisition terminal 2 may be managed by the distributed data processing terminal 6. In such case, the user at the distributed data processing terminal 6 enters information identifying one or more of the image acquisition terminals 2, as a remote control target.

Through operation of FIGS. 17 and 18, the distributed data processing terminal 6 performs objection detection service, provided by the service providing server 8, with respect to the image acquisition terminal 2. The processing of objection detection service includes a series of processing described below.

<Preparation Processing for Image Recognition>

Figure 21:
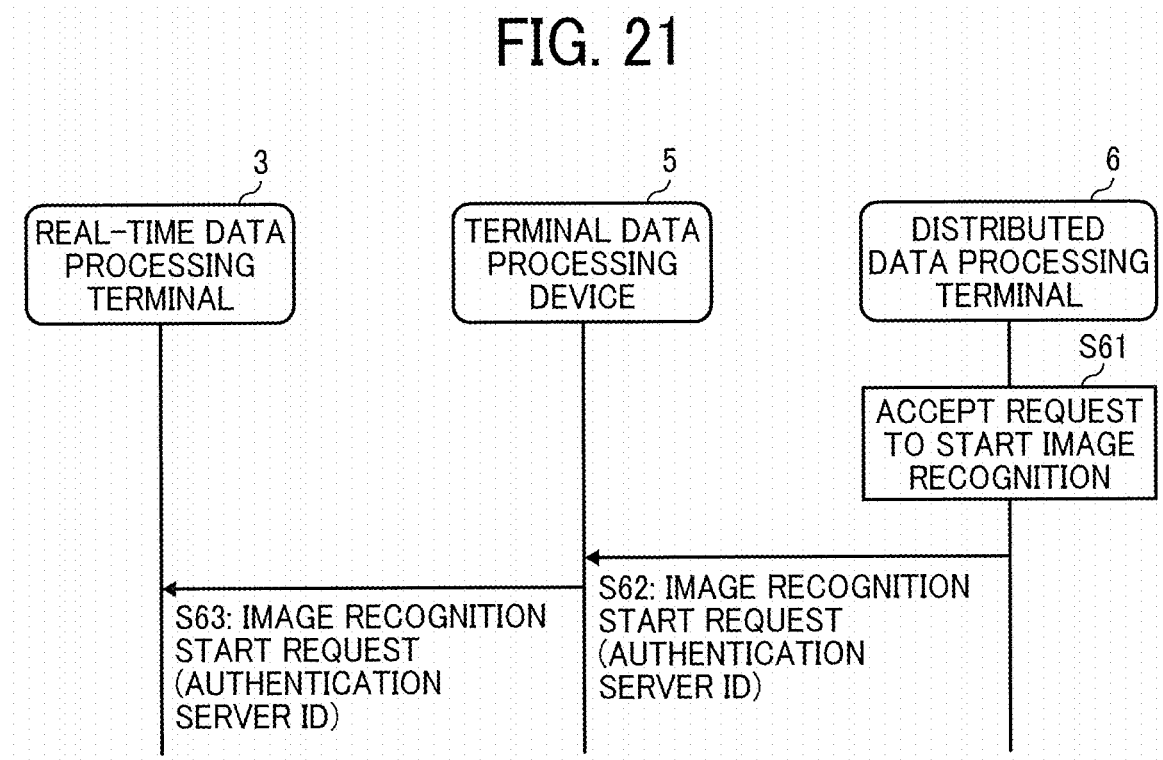
FIG. 21 is a sequence diagram illustrating operation of processing an image recognition start request, performed by the communication system 1, according to an embodiment.
Figure 22:
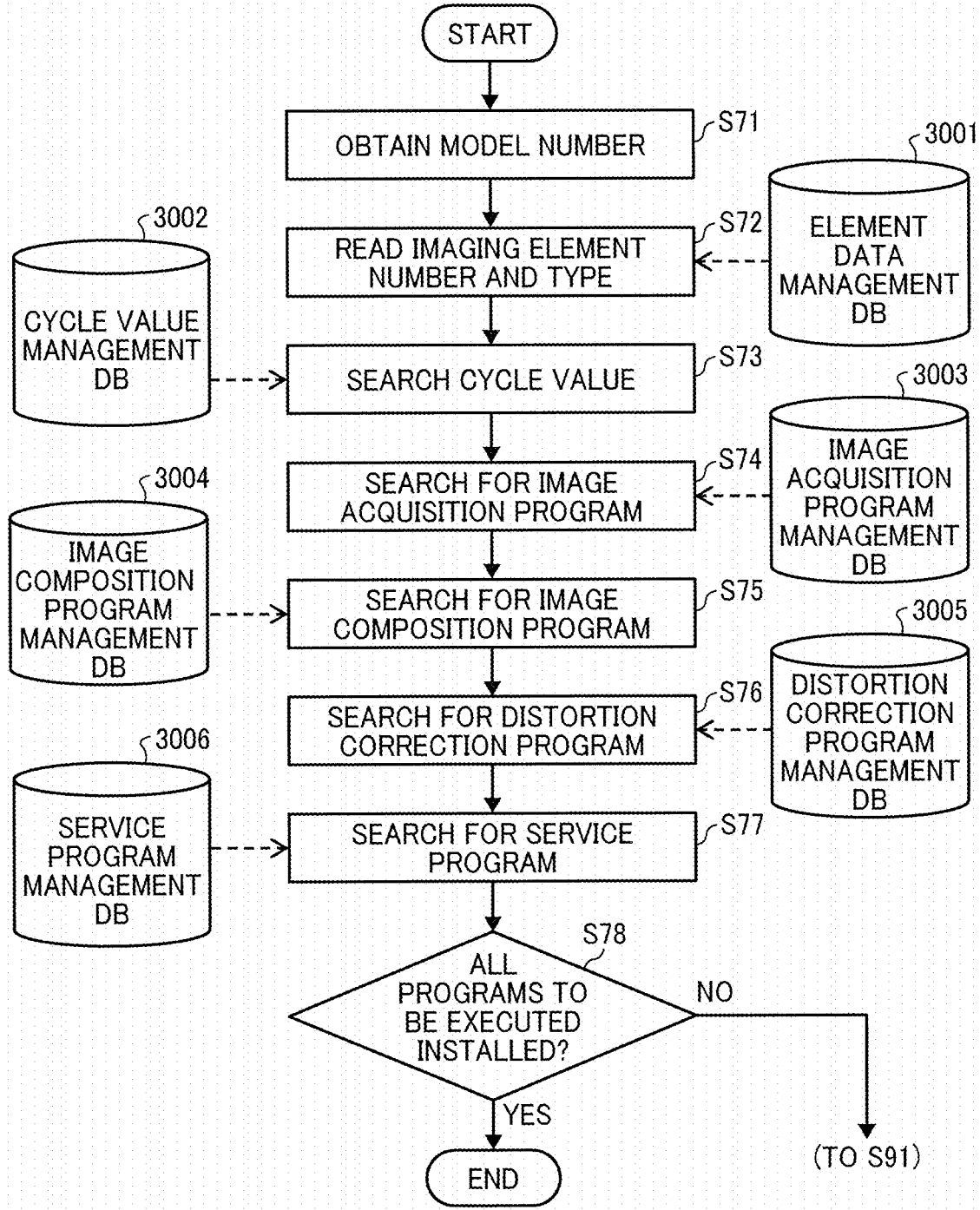
FIG. 22 is a sequence diagram illustrating operation of preparing for real-time processing to be performed by the real-time data processing terminal, according to an embodiment.
Figure 23:
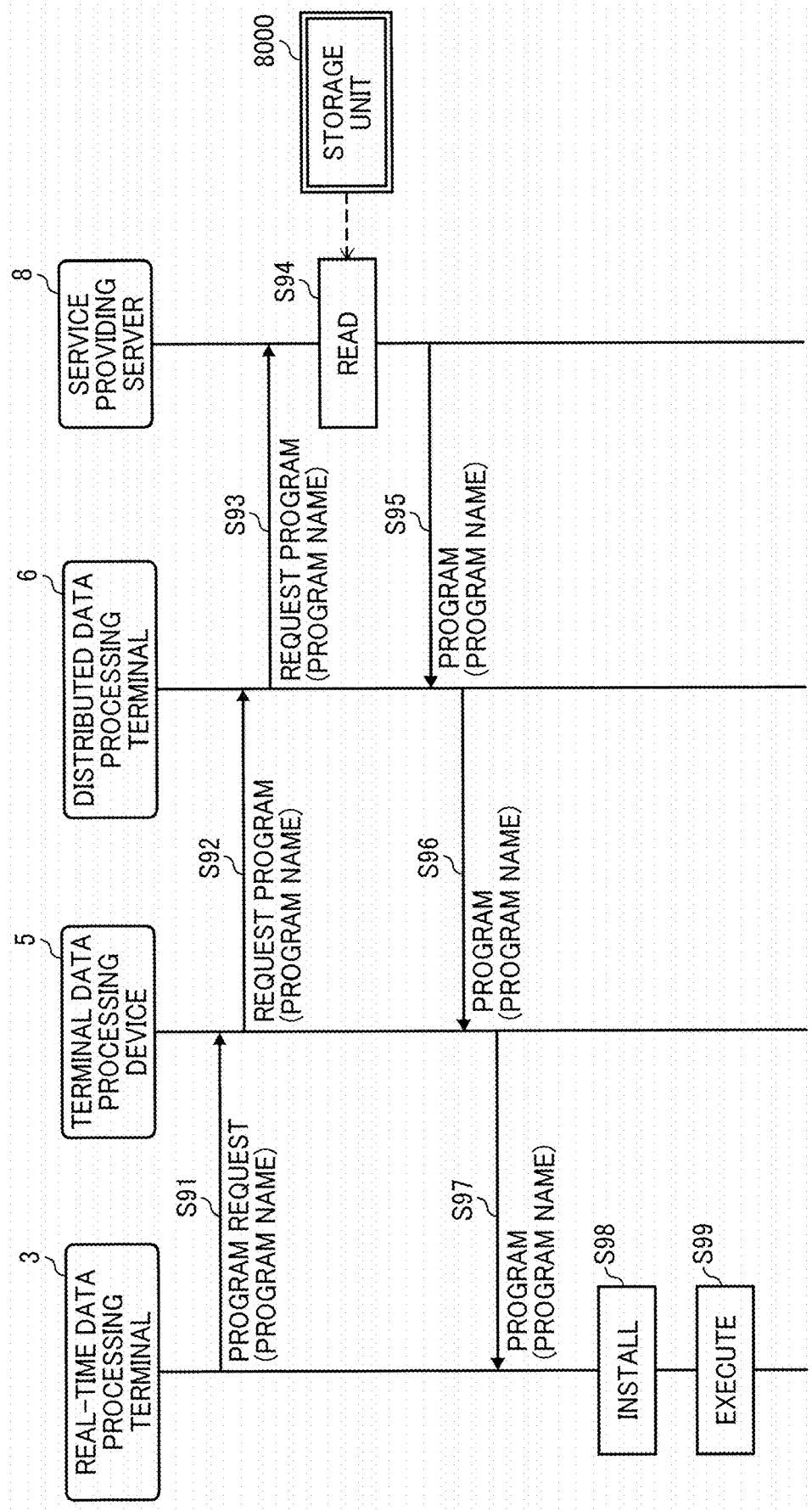
FIG. 23 is a sequence diagram illustrating operation of acquiring a program, performed by the communication system, according to an embodiment.

Referring now to FIGS. 21 to 23, image recognition preparation processing is described according to the embodiment. FIG. 21 is a sequence diagram illustrating operation of processing an image recognition start request, performed by the communication system 1, according to the embodiment.

As illustrated in FIG. 21, in the distributed data processing terminal 6, the acceptance unit 62 accepts a request to start image recognition from the user (S61). In this example, the distributed data processing terminal 6 displays a screen to the user using a GUI (Graphical User Interface), which allows the user to input an instruction. In other words, the distributed data processing terminal 6 provides a user interface for the real-time data processing terminal 3. In response to a user instruction, the transmitter and receiver 61 of the distributed data processing terminal 6 transmits a request to start image recognition to the terminal data processing device 5 for the image acquisition terminal as the remote-control target (S62). The start request includes the authentication server ID for identifying the authentication server 9 that has performed the above-described authentication processing (FIGS. 17 and 18) and the session ID set in the operation of FIG. 18, which are respectively received at S49 of FIG. 18. The transmitter and receiver 51 of the terminal data processing device 5 receives the image recognition start request. The communication unit 58 of the terminal data processing device 5 transmits the image recognition start request to the real-time data processing terminal 3 (S63). The communication unit 48 of the real-time data processing terminal 3 receives the image recognition start request. As described above, since the user interface is separate from the real-time data processing terminal 3, remote control of the real-time data processing terminal 3 is made possible from the distributed data processing terminal 6 that provides a user interface for the real-time data processing terminal 3.

FIG. 22 is a sequence diagram illustrating operation of preparing for real-time processing to be performed by the real-time data processing terminal 3, according to the embodiment. For example, the real-time data processing terminal 3 of the image acquisition terminal 2, which has received the image recognition start request in FIG. 21, executes the sequence of FIG. 22. As illustrated in FIG. 22, the connection unit 38 of the real-time data processing terminal 3 acquires the model number of the imaging unit 40 from the imaging unit 40 (S71). In this case, in response to a request for model number from the connection unit 38, the imaging unit 40 transmits the model number of its own imaging unit 40 to the connection unit 38.

More specifically, the storing and reading unit 39 searches the imaging element data management DB 3001 (FIG. 10A) using the model number of the imaging unit 40, acquired from the imaging unit 40 at S71, as a search key, to read the number of imaging elements and the lens type that are associated with the acquired model number. Furthermore, the storing and reading unit 39 searches the cycle value management DB 3002 (FIG. 10B) using the number of imaging elements, which is read at S72, as a search key to obtain the cycle value associated with the number of imaging elements that is read (S73).

Next, the storing and reading unit 39 searches the image acquisition program management DB 3003 (FIG. 11A) for the image acquisition program to be executed by the image acquisition terminal 2 (real-time data processing terminal 3), using the number of imaging elements read out at S72 as a search key (S74). Similarly, the storing and reading unit 39 searches the image composition program management DB 3004 (FIG. 11B) for the image composition program to be executed by the image acquisition terminal 2 (real-time data processing terminal 3), using the number of imaging elements read out at S72 as a search key (S75). Similarly, the storing and reading unit 39 searches the distortion correction program management DB 3005 (FIG. 11C) for the distortion correction program to be executed by the image acquisition terminal 2 (real-time data processing terminal 3), using the lens type read out at S72 as a search key (S76). Further, the storing and reading unit 39 searches the service program management DB 3006 (FIG. 11D) for the service program to be executed by the image acquisition terminal 2 (real-time data processing terminal 3), using the authentication server ID that is received at S63 (FIG. 21) as a search key (S77).

Next, the determiner 33 determines whether or not all the programs to be executed are installed (S78), based on the search results at S74 to S77, each indicating whether or not information indicating that the program to be executed is installed is stored in the corresponding DB (table). For example, when the search result by the storing and reading unit 39 indicates that information indicating that the image acquisition program is installed is stored in the image acquisition program management DB 3003 at S74, the determiner 33 determines that the image acquisition program has been installed. In contrary, when the search result indicates that information indicating that the image acquisition program is not installed is stored in the image acquisition program management DB 3003, the determiner 33 determines that the image acquisition program is not installed.

When the determiner 33 determines that all four programs are installed (S78: YES), the operation of FIG. 22 ends. On the other hand, when the determiner 33 determines that at least one program among the four programs is not installed (S78: NO), the operation proceeds to S91 described below referring to FIG. 23.

Please note that a number of programs to be installed differs depending on the number of imaging elements or type of lens of the imaging unit 40.

FIG. 23 is a sequence diagram illustrating processing to acquire a program, performed by the communication system 1, according to the embodiment. In this example, the real-time data processing terminal 3 acquires a program that is determined as not installed through the operation of FIG. 22, from the service providing server 8.

First, as illustrated in FIG. 23, the communication unit 48 of the real-time data processing terminal 3 transmits, to the communication unit 58 of the terminal data processing device 5, a request for a program not installed (S91). This request for program includes a name of the program to be installed obtained through operation of FIG. 22, and the authentication server ID and the session ID that are received at S63 of FIG. 21.

Next, the transmitter and receiver 51 of the terminal data processing device 5 transmits the program request received at the communication unit 58 to the transmitter and receiver 61 of the distributed data processing terminal 6 (S92). Then, the transmitter and receiver 61 of the distributed data processing terminal 6 transmits the program request to the transmitter and receiver 81 of the service providing server 8, through the established session (S93).

Next, in the service providing server 8, the storing and reading unit 89 checks the validity of the program request based on the authentication server ID and the session ID in the program request, and reads out a program indicated by the program name included in the program request (S94). Then, the transmitter and receiver 81 transmits the read program to the transmitter and receiver 61 of the distributed data processing terminal 6 (S95). With the read program, a name of the requested program, the authentication server ID, and the session ID are also transmitted.

Next, the transmitter and receiver 61 of the distributed data processing terminal 6 transmits a program identified with the program name to the transmitter and receiver 51 of the terminal data processing device 5 of the image acquisition terminal 2, which is identified with the authentication server ID and the session ID (S96). The communication unit 58 of the terminal data processing device 5 transmits the program identified with the program name to the communication unit 48 of the real-time data processing terminal 3 (S97).

Next, the storing and reading unit 39 of the real-time data processing terminal 3 installs the program acquired by the communication unit 48. The storing and reading unit 39 further registers, in corresponding one of the tables of FIGS. 11A to 11D, information indicating that the requested program is installed. For example, in case the service program is installed, the storing and reading unit 39 registers, in the service program management table of 11D, the information indicating installation of the service program in association with the program name of the program being installed and the authentication server ID (S98).

Next, the storing and reading unit 39 activates all the programs necessary for image recognition processing (S99). Accordingly, the real-time data processing terminal 3 starts the real-time processing as described below, by executing the activated programs.

<Image Recognition Processing>

(Object Detection Processing)

Figure 24:
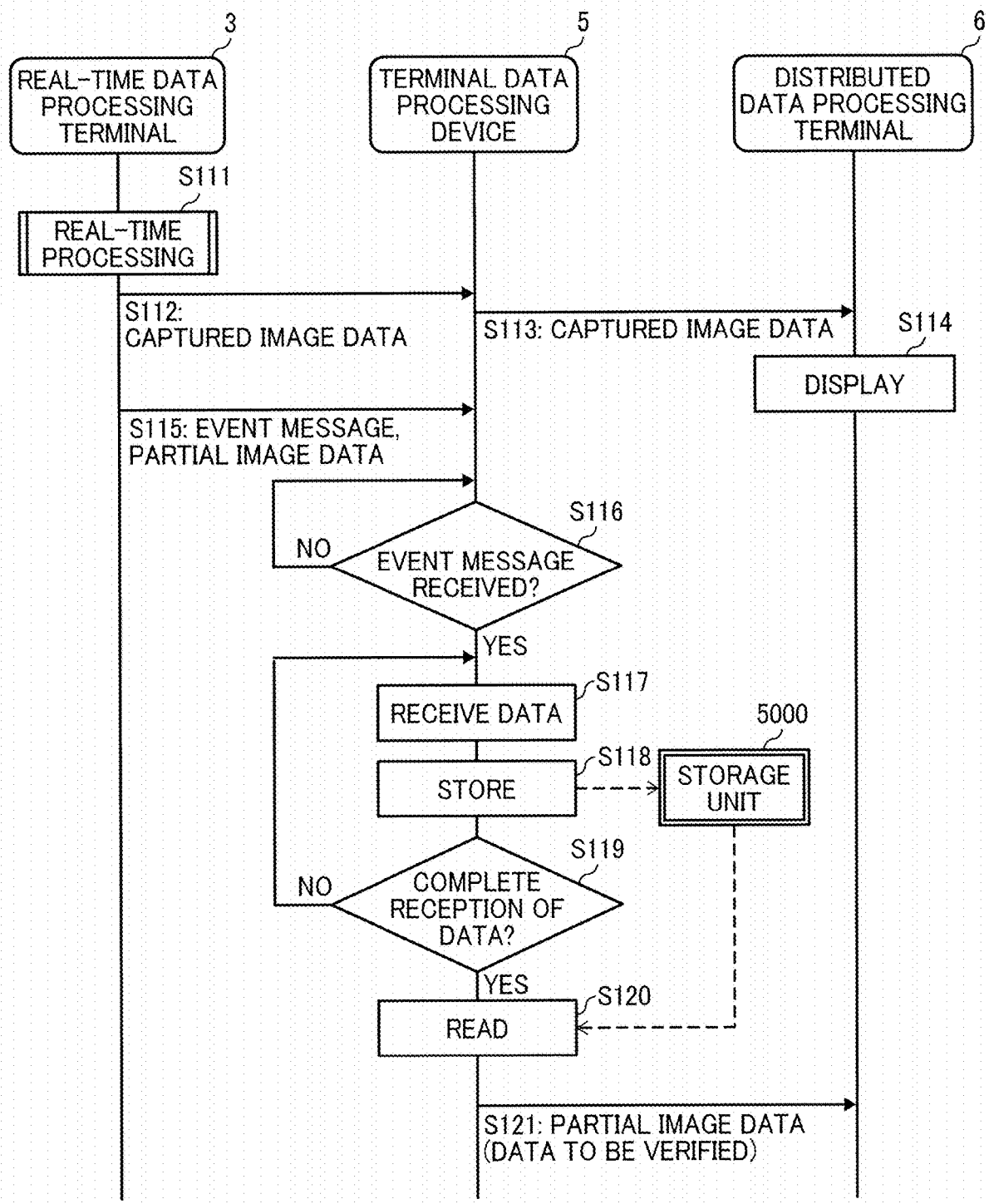
FIG. 24 is a sequence diagram illustrating an example of image recognition processing, performed by the communication system 1, according to the embodiment.
Figure 25:
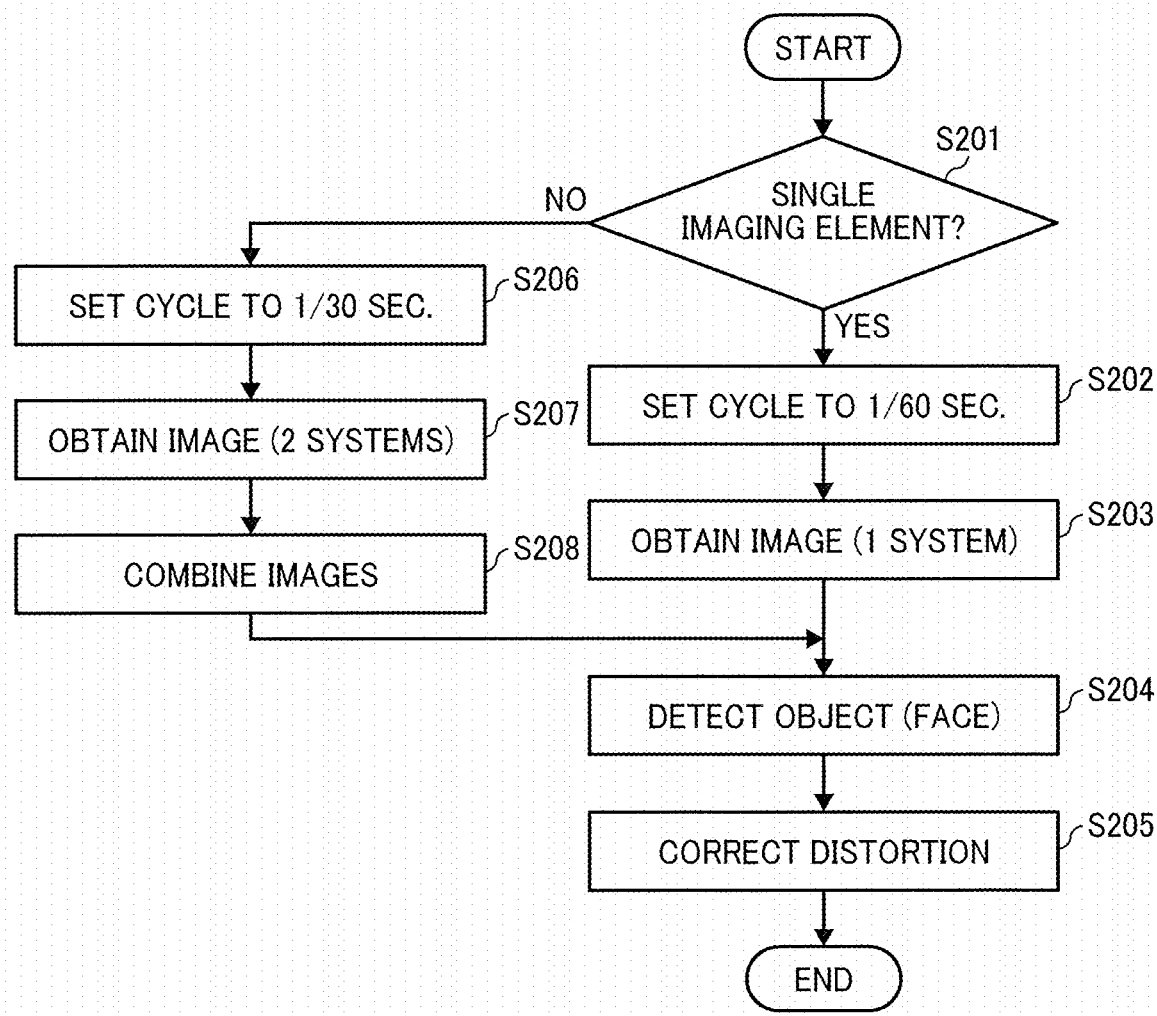
FIG. 25 is a flowchart illustrating an example of object detection processing, performed in the real-time processing.

The following describes the example case in which the "log in to object detection service" button a1 illustrated in FIG. 19 is pressed and the service providing server 8 permits the distributed data processing terminal 6 to execute the object detection service as described above referring to FIGS. 17 to 23. That is, after the above-described operations referring to FIGS. 17 to 20 are performed, the "start remote control" button c2 in FIG. 20 is pressed at the distributed data processing terminal 6, designating the image acquisition terminal 2 as a remote control target. The distributed data processing terminal 6 transmits a request to start image recognition to the image acquisition terminal 2. FIG. 24 is a sequence diagram illustrating image recognition processing, performed by the communication system 1 of FIG. 1, according to the embodiment. The real-time data processing terminal 3 performs real-time processing (S111). In the following, the real-time data processing is described with reference to FIGS. 25 and 26. FIG. 25 is a flowchart illustrating an example of object detection processing, performed in the real-time processing.

As illustrated in FIG. 25, the determiner 33 determines whether or not a number of imaging elements in the imaging unit 40, connected to the real-time data processing terminal 3, is one (S201). In this case, the determiner 33 determines the number of imaging elements, based on the number of imaging elements read out at S72. If the number of imaging elements is one (S201: YES), referring to the cycle value management table of FIG. 10B, the image processing unit 34 sets a cycle value, which defines a time interval for repeating the real-time processing, to 1/60 seconds (S202). Specifically, the image processing unit 34 sets the cycle value read out at S73.

Next, the connection unit 38 acquires captured image data, from the imaging unit 40 having one imaging system (here, the imaging unit 40a) (S203). The captured image data is digital image data, and is, for example, data of 4K image (3840 image pixel width X 2160 image pixel height). In this case, the connection unit 38 executes processing according to the image acquisition program (ProgC01 (1 system)) described above referring to FIG. 11A. In executing this processing, the real-time data processing terminal 3 does not have to determine whether or not execution of the image acquisition program is allowed using the authentication server ID included in the image recognition start request, with reference to the table of FIG. 11D. That is, since the image acquisition program is previously determined as the application not requiring authentication, authentication is not performed.

Next, the object detector 35 searches for feature points in the captured image data, as a candidate of a specific object, to detect the specific object (S204). Specifically, the object detector 35 picks up a rectangular section, one by one, starting from the edge of the captured image, to search for features points that match the shape model data of the object that is previously stored in the storage unit 3000, and specifies a position (coordinates) of the feature points that match the shape model data. The processing of S204 may be performed using any desired known method, such as the method described in, for example, Hitoshi IMAOKA, et. al., "Face recognition technology and its application: features on elemental technologies and solutions supporting public safety", Biometrics authentication, NEC Technical Journal, Vol. 63, no. 3, pp. 26-30, September 2010. In this case, the object detector 35 determines whether or not the authentication server ID included in the image recognition start request received at S63 is an appropriate authentication server ID managed in the service program management table of FIG. 11D, in association with the service program (ProgD01 (object detection)), and executes the processing based on the determination result. That is, since the object detection service program is previously determined as the application requiring authentication, authentication is performed.

Next, the image processing unit 34 corrects the distortion in the image including the detected object (S205). In this case, the image processing unit 34 executes processing according to the image processing program (ProgW01 (wide-angle correction)) as described above referring to FIG. 11C. In executing this processing, the real-time data processing terminal 3 does not have to determine whether or not execution of the wide-angle distortion correction program is allowed using the authentication server ID included in the image recognition start request, with reference to the table of FIG. 11D. That is, since the distortion correction program is previously determined as the application not requiring authentication, authentication is not performed.

On the other hand, when the number of imaging elements is not one (S201: NO), referring to the cycle value management table of FIG. 10B, the image processing unit 34 sets a cycle value indicating a cycle time for repeating the real-time processing, to 1/30 seconds (S206). Specifically, the image processing unit 34 sets the cycle time to be the cycle value read out at S73. The cycle time is set to 1/30 seconds, which is longer than a time it requires for one input, thus preventing the later-described image composition processing from delaying.

Next, the connection unit 38 acquires two items of captured image data from the imaging unit 40 having two imaging systems (the imaging unit 40b) (S206). The two items of captured image data are data of hemispherical images as illustrated in FIGS. 4A and 4B, respectively. In this case, the connection unit 38 executes processing according to the image acquisition program (ProgC02 (2 systems)) as described referring to FIG. 11A. In executing this processing, the real-time data processing terminal 3 does not have to determine whether or not execution of the image acquisition program is allowed, as described above.

Then, the image processing unit 34 combines the two items of captured image data to create an equirectangular projection image EC as illustrated in FIG. 4C (S208). In this case, the image processing unit 34 executes the processing according to the image composition program (ProgS02 (image composition)) described referring to FIG. 11B. In executing this processing, the real-time data processing terminal 3 does not have to determine whether or not execution of the image composition program is allowed using the authentication server ID included in the image recognition start request, with reference to the table of FIG. 11D.

The operation then proceeds to S204, and the object detector 35 detects the feature points of the object in data of the equirectangular projection image EC, to detect the object. In this case, the image processing unit 34 determines whether or not the authentication server ID included in the image recognition start request is an appropriate authentication server ID managed in the table of FIG. 11D, in association with the service program (ProgD01 (object detection)), and executes the processing based on the determination result.

Next, at S205, the image processing unit 34 corrects the distortion in the image of the detected object. In this case, the image processing unit 34 executes processing according to the image processing program (ProgW02 (fish-eye correction)) as described above referring to FIG. 11C. In executing this processing, the real-time data processing terminal 3 does not have to determine whether or not execution of the fish-eye distortion correction program is allowed using the authentication server ID included in the image recognition start request, with reference to the table of FIG. 11D.

As described above, in real-time processing, S204 of detecting an object is performed based on authentication.

Figure 27A:
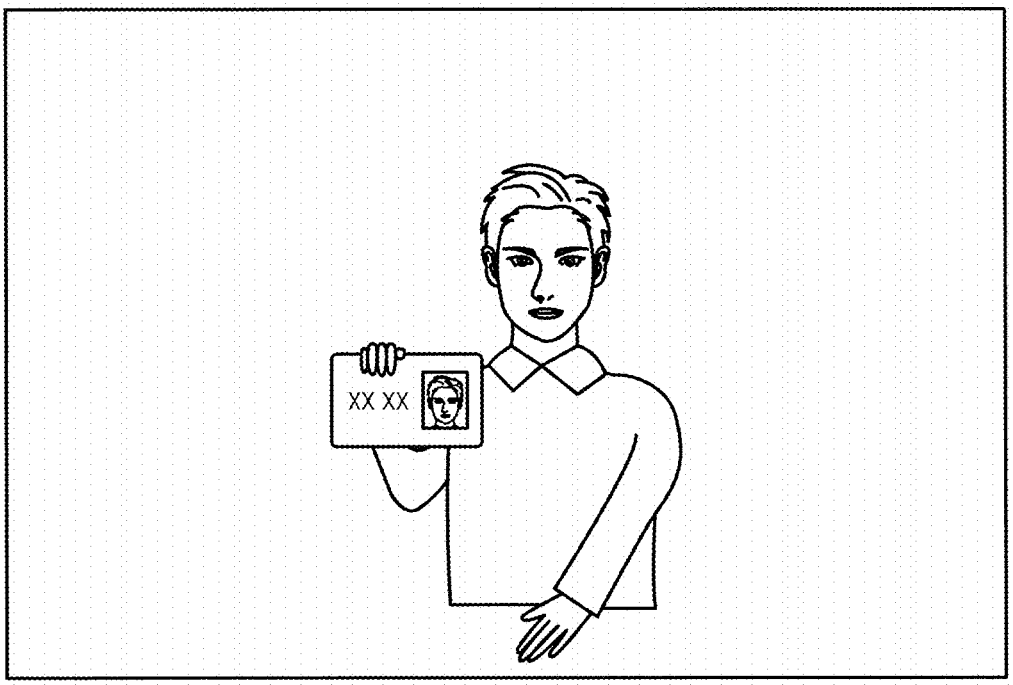
FIGS. 27A and 27B are each an illustration of an example captured image, displayed at the distributed data processing terminal.
Figure 27B:
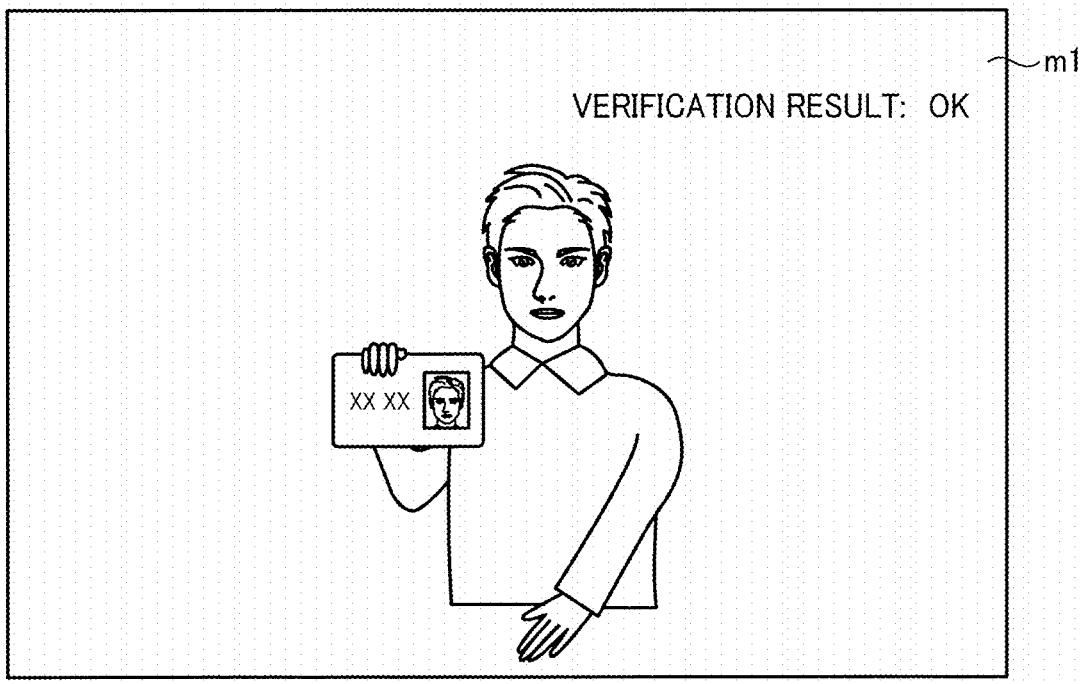

Referring back to FIG. 24, the communication unit 48 of the real-time data processing terminal 3 transmits captured image data to the communication unit 58 of the terminal data processing device 5 (S112). The transmitter and receiver 51 of the terminal data processing device 5 transmits the captured image data received at S112 to the transmitter and receiver 61 of the distributed data processing terminal 6 (S113). Accordingly, the display control 67 of the distributed data processing terminal 6 causes the display 517 to display a captured image as illustrated in FIG. 27A in real time (S114). FIGS. 27A and 27B are each an illustration of an example captured image, displayed at the distributed data processing terminal 6. The captured image is displayed with a frame that indicates a rectangle having a detected object (in this case, a detected human face). The above-described S112 to S114 correspond to process to stream data.

Communication Control

First Embodiment

Figure 26:
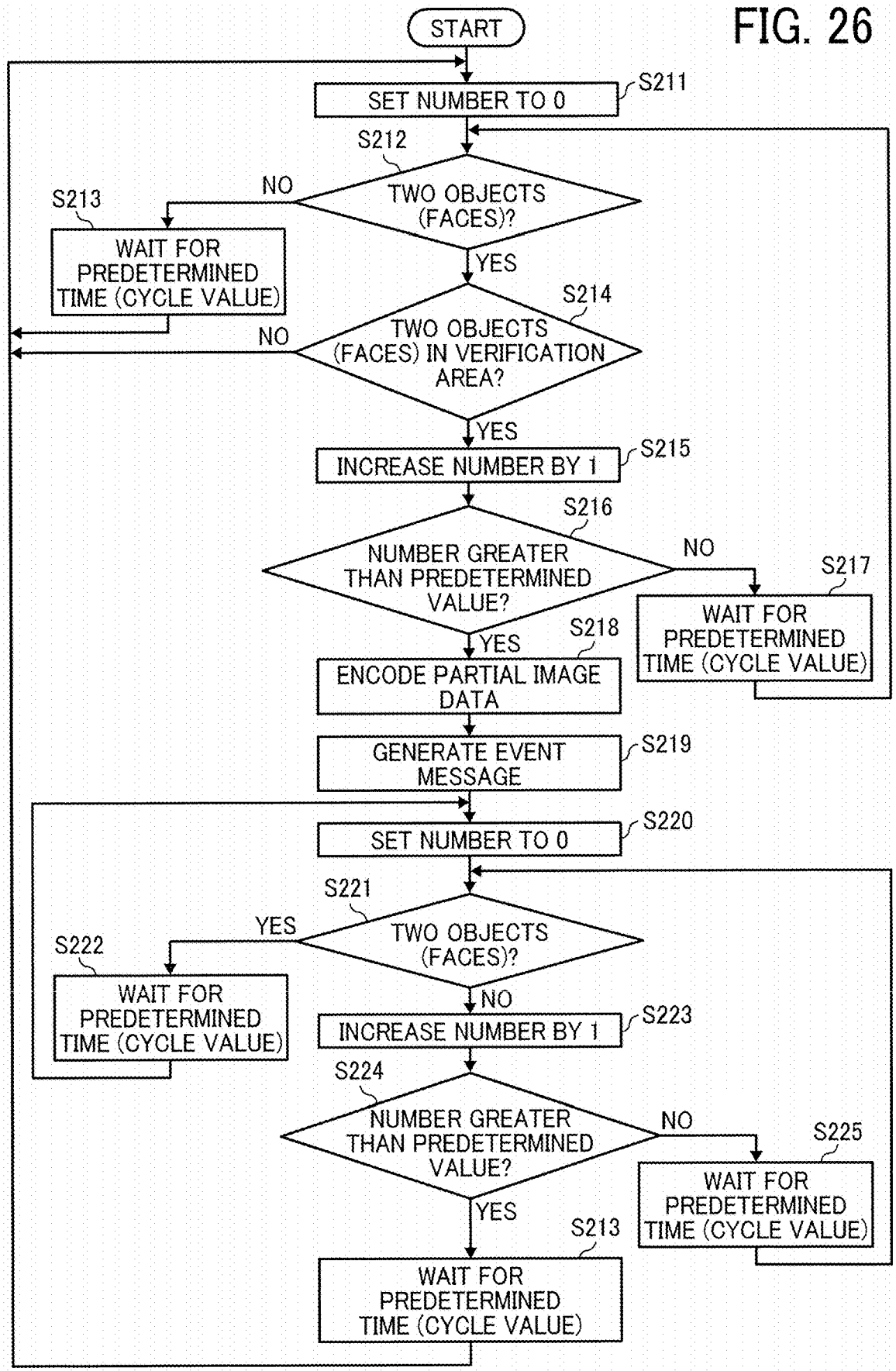
FIG. 26 is a flowchart illustrating an example of event generation processing, performed in the real-time processing.
Figure 28:
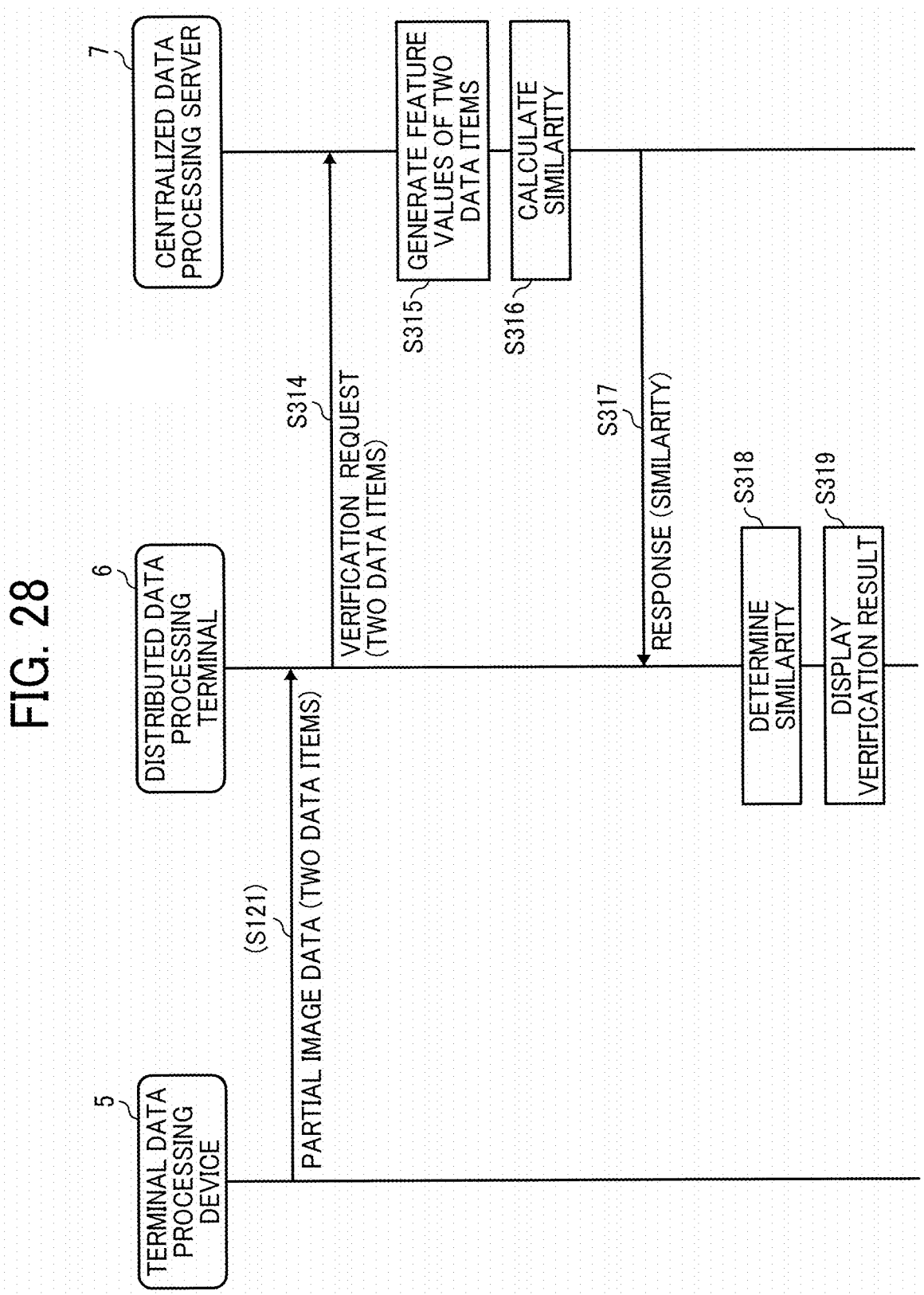
FIG. 28 is a sequence diagram illustrating processing of verifying data to be verified, according to a first embodiment.
Figure 29:
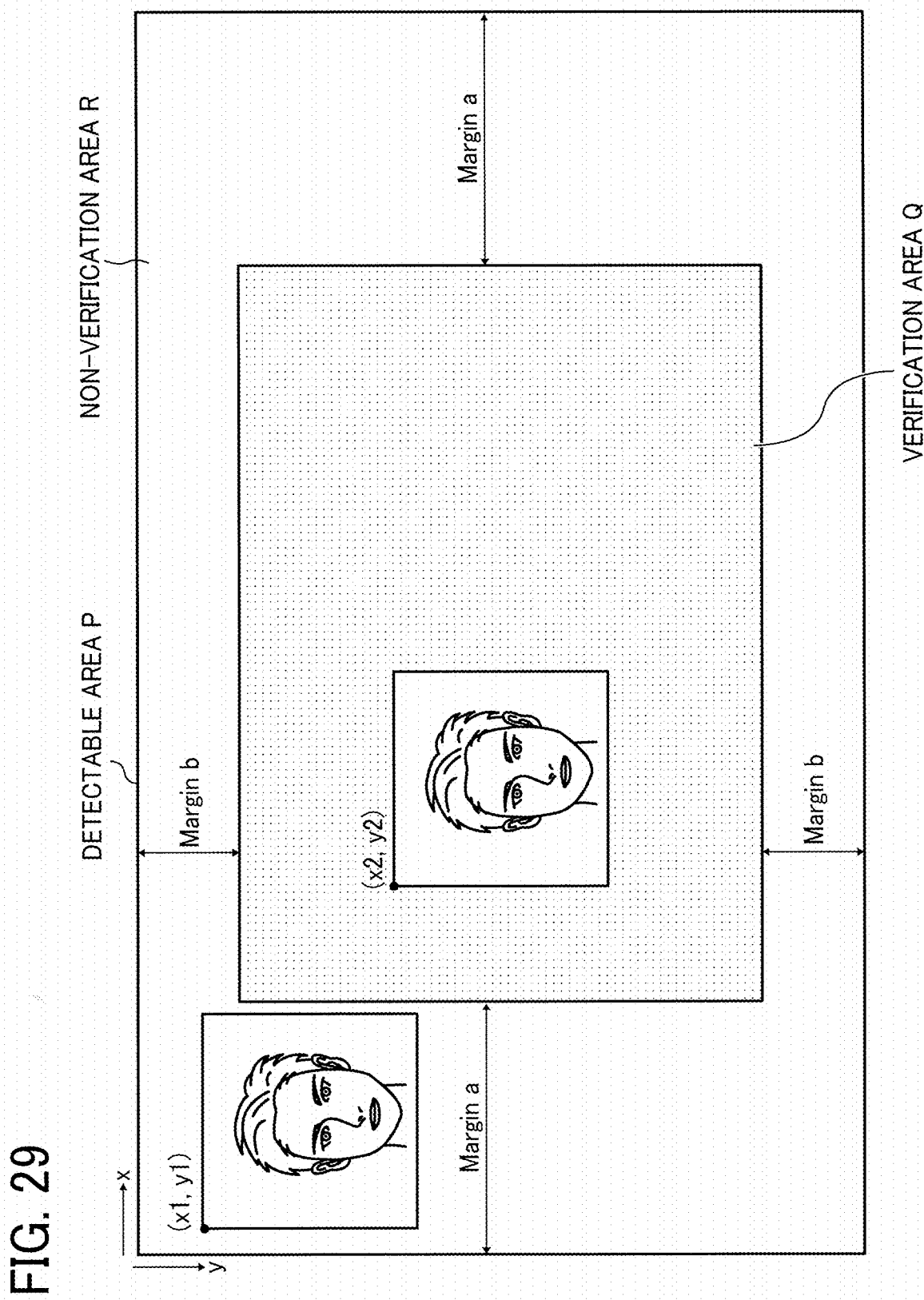
FIG. 29 is a diagram illustrating an image capturing area of the imaging unit, when the image acquisition terminal is provided in a certain room, according to the embodiment.

Referring to FIGS. 26 to 29, operation of controlling communications is described according to a first embodiment. FIG. 26 is a flowchart illustrating an example of event generation processing, performed in the real-time processing. FIG. 28 is a sequence diagram illustrating verification processing, according to the embodiment. FIG. 29 is a diagram illustrating an image capturing area of the imaging unit, when the image acquisition terminal is provided in a certain room, according to the embodiment.

As illustrated in FIG. 26, the object detector 35 sets a number of detections of an object (count) to 0 (S211). The object detector 35 determines whether a detection result generated at S204 indicates that two objects (in this example, the object is a human face) are detected. When the detection result indicates that two objects are not detected (S212: NO), the operation proceeds to S213 to wait for a predetermined time period (defined by preset cycle value), and returns to S211. For example, the preset cycle value is set to 30 times per second, such that detection is performed 30 times a second.

On the other hand, when the detection result of S204 indicates that two objects (in this example, the object is a human face) are detected (S212: YES), the operation proceeds to S214. The determiner 33 determines whether any one of the detected positions of objects is out of a verification area Q, which is an area that the object can be verified (S214). When it is determined that any one of the detected positions of objects is out of the verification area Q (S214: NO), the operation proceeds to S213, and further to S211.

Referring now to FIG. 29, the verification area Q is described. FIG. 29 is a diagram illustrating an image capturing area of the imaging unit 40, when the image acquisition terminal 2 is provided in a certain room. The detectable area P is a range of the image capturing area in which the imaging unit 40 can detect an object (in this case, a face). The detectable area P includes a verification area Q in which an image of the object (i.e., face) can be verified, and a non-verification area R other than the verification area Q in which an image of the object cannot be verified. Still referring to FIG. 29, the verification area Q can be defined by margins a and b of the detectable area P. The margin a is arbitrarily set for each of right and left sides in X direction, and the margin b is arbitrarily set for each of upper and lower sides in Y direction. Information on the areas, such as the margins a and b, are stored in the service program acquired by the real-time data processing terminal 3 at S97 illustrated in FIG. 23.

The processing to detect an object at S204 is performed throughout the detectable area P of the image capturing area. If the detected object is out of the range (in this case, a rectangular area) defined by the margins a and b, that object is not within the verification area Q, but within the non-verification area R. Here, (x1, y1) represents the coordinates of the upper left corner of the partial image data indicating an area in which the object is detected. The determiner 33 uses information on the coordinate to determine whether the partial image data of any one of the detected objects is within the verification area Q.

Referring back to FIG. 26, when the determiner 33 determines that both of the detected objects (i.e., the detected positions) are within the verification area Q (S214: YES), the object detector 35 increases the number of detections by one (S215), and the operation proceeds to S216. For example, if the coordinates of the upper left corner of the partial image data of the object are at the position indicated by the coordinates (x2, y2) in FIG. 29, the determiner 33 determines that the object is within the verification area Q. The object detector then determines whether the number of detections is greater a predetermined value (S216). When the number of detections is greater the predetermined value (S216: YES), the operation proceeds to S218. In this example, the predetermined value may be any number that is arbitrarily set by the user, such as 10 times. When the number of detections is equal to or less than the predetermined value (S216: NO), the operation proceeds to S217 to wait for the predetermined time period (preset cycle value), and returns to S212.

At S216, the operation proceeds to S218 only when the number of detections exceeds the predetermined value. As illustrated in FIG. 27A, it is assumed that the imaging unit 40 of the image acquisition terminal 2 is detecting the user's face and card (a card printed with a photo of the user's face), for authentication of a particular user. In such case, other user, who is not subject to authentication, may present the user's card, or may walk through an image capturing area of the image acquisition terminal 2. If the terminal data processing device 5 transmits all images of users (faces) detected even for a short time period, data communication increases. In view of this, in this embodiment, the terminal data processing device 5 does not transmit the partial image data to the distributed data processing terminal 6, when an image of such user not subjected to authentication, which has been detected for a short time period, has been captured. This reduces a number of transmissions of processing requests (that is, the number of communications or the amount of data for communication), which are not necessary. This processing to control data transmission is referred to as a first communication control.

When the determiner 33 determines that the number of detections exceeds the predetermined value (S216: YES), the image processing unit 34 encodes two items of partial image data, each partial image being a part of the captured image that includes the detected face, in a general-purpose format such as JPEG (S218). The event generator 36 generates an event message notifying that the partial image data of detected objects is transmitted to the terminal data processing device 5 (S219). Specifically, the event generator 36 generates the event message such as "Send". The object detector 35 then sets (resets) a number of detections of objects to 0 (S220), and the operation proceeds to S221. In response to the event message generated at S219, the operation of S121 illustrated in FIG. 28 is performed. At S121, the terminal data processing device 5 transmits the obtained two items of partial image data, to the distributed data processing terminal 6. It is assumed that the two items of partial image data are an image of the face of the user and an image of the user's face printed on the user's card.

After the items of partial image data are sent, the operation further proceeds to S221 to determine whether the detection result of S204 illustrated in FIG. 25 indicates that two objects (in this example, human faces) are detected. When the object detector 35 determines that two objects are detected (S221: YES), the operation proceeds to S222 to wait for a predetermined time period (preset cycle value), and further to S220 to reset the number of detections of objects to 0. For example, the user may still be present in the image capturing area of the image acquisition terminal 2, even after two items of partial image data are sent for user authentication. Accordingly, the image acquisition terminal 2 continues detecting the user's face and the photo of the user's card (that is, two objects) for a time longer than it is required. In view of this, S221 is performed so as to prevent re-transmission of partial image data of the same user. This further reduces a number of processing requests to be transmitted (that is, the number of times of communications or the amount of data for communication), which are unnecessary. This processing to control data transmission is referred to as a second communication control.

On the other hand, when the detection result of S204 indicates that two objects (in this example, faces) are not detected (S221: NO), the operation proceeds to S223 to increase the number of detections by one, and further to S224. When the number of detections does not exceed the predetermined value (for example, ten times) ("NO" at S224), the operation proceeds to S225 to wait for the predetermined time period (defined by the preset cycle value), and further returns to S221. For example, even after two items of partial image data are sent for user authentication, it is most likely that the same user still exists in the image capturing area of the image acquisition terminal 2. For example, even when the detection result indicates that two faces are not detected at S221, there may be case in which an image of the face of the same user may be kept captured. For example, if the same user has turned over the photograph of the user's card, such that the photograph faces toward the user, not toward the image acquisition terminal 2, only one object is detected. In another example, even when no object is detected, or more than two objects are detected, the same user may be present at least for a short time period right after two items of partial image data are sent. In view of this, S224 is performed so as to prevent re-transmission of partial image data of the same user. This further reduces a number of processing requests to be transmitted (that is, the number of times of communications or the amount of data for communication), which are unnecessary. This processing to control data transmission is referred to as a third communication control.

When the number of detections exceeds the predetermined value (for example, 10 times) (S224: YES), the operation proceeds to S213 to wait for the predetermined time period, and returns to S211.

The real-time processing of S111 illustrated in FIG. 24 then ends. Referring back to FIG. 24, the communication unit 48 transmits the event message generated at S219 and the partial image data (in this example, two items of partial image data) to which distortion correction is applied at S205 (FIG. 25) to the communication unit 58 of the terminal data processing device 5 (S115). When a plurality of objects (in this case, human faces) are detected at S204, at S115, a plurality of items of partial image data are transmitted together with one event message. In this example, a set of an image of the user's face and an image of a photo of the user's face are transmitted. When real-time detection of an object (human face) is not necessary, such as in the example case where the distributed processing system 100 is disposed in a shop or the like, the real-time data processing terminal 3 may accumulate the event message and the partial image data in its local memory during a day, when the shop is opened. After the shop is closed, for example, during the night, the real-time data processing terminal 3 may transmit the event message and the partial image data to the terminal data processing device 5.

Next, the data detector 56 of the terminal data processing device 5 detects whether or not the event message "Send" is received at the communication unit 58 (S116). When the event message is received (S116: YES), the communication unit 58 receives the partial image data transmitted together with the event message (S117). The storing and reading unit 59 temporarily stores the partial image data in the storage unit 5000 (S118).

Next, the data detector 56 monitors for the partial image data to determine whether reception of the partial image data is completed or not (S119). The processing of S119 is repeated until all items of partial image data are received for all of event messages that are received (S119: NO). When reception of the partial image data is completed (S119: YES), the storing and reading unit 59 reads partial image data, each having been transmitted with the event message and temporarily stored in the storage unit 5000 (S120). The transmitter and receiver 51 transmits all items of partial image data read out at S120 to the transmitter and receiver 61 of the distributed data processing terminal 6 via the intranet 200 (S121). Accordingly, the transmitter and receiver 61 of the distributed data processing terminal 6 receives the two items of partial image data for each event message. The two items of partial image data, which are received with the event message, are later compared with each other to obtain similarity.

<Verification Processing>

Next, referring to FIG. 28, processing of verifying data to be verified, i.e., the partial image data, is described, according to an embodiment. FIG. 28 is a sequence diagram illustrating verification processing, according to the embodiment.

At S121, as described above, the transmitter and receiver 61 of the distributed data processing terminal 6 receives two items of partial image data. The transmitter and receiver 61 transmits a verification request to the centralized data processing server 7 through the Internet 600 (S314). The verification request includes the two items of partial image data, which are received. The centralized data processing server 7 receives the verification request at the transmitter and receiver 71.

Next, in the centralized data processing server 7, the feature value generator 74 decodes both data (the two items of partial image data) into bitmap data, and calculates parameters of feature values for each of the partial image data (S315). Such feature value parameters are used to identify an individual using various types of information that can be discriminative such as height or slope of facial components such as a nose or eyes detected in the facial image. The verification unit 75 compares the feature value parameters between one partial image data and other partial image data, and calculates the degree of similarity between these data (S316). The similarity may be calculated using any desired method, such as the method based on a deep neural network (DNN: Deep Neural Network), described in Takayuki OKATANI, "Deep learning and image recognition: basic and recent trends (<Special feature> Neuroscience and mathematical modeling)" Operations research: Management science 60 (4), 198-204, 2015-04-01. In this example, the feature value parameters of the partial image data to be verified (such as an image of the user's face) are an example of a first feature value parameter, and the feature value parameters of the partial image data used for verification (such as an image of the photo of the user's face) are an example of a second feature value parameter.

Next, the transmitter and receiver 71 of the centralized data processing server 7 transmits a response to the verification request received at S314 to the transmitter and receiver 61 of the distributed data processing terminal 6 via the Internet 600 (S317). The response includes the degree of similarity, which is calculated at S316 as the verification result. The degree of similarity may be expressed in number, such as 0.9 with 1.0 representing the exact match. The transmitter and receiver 61 of the distributed data processing terminal 6 receives the response including the verification result. When the similarity is greater than a threshold that is previously set, the centralized data processing server 7 may obtain, from the storage unit 7000, an object name, an identification code, and the like of an object having the calculated feature values, if such information is available. The centralized data processing server 7 then transmits the response including information on the object having the calculated feature values, to the distributed data processing terminal 6 at S317.

Next, the determiner 63 of the distributed data processing terminal 6 compares the calculated similarity with a predetermined threshold (for example, 0.8), and determines that the detected objects match when the similarity is greater than the threshold. When the calculated similarity is equal to or less than the threshold, the distributed data processing terminal 6 determines that the detected objects do not match (S318). The display control 67 controls the display 517 of the distributed data processing terminal 6, to display the verification result message as illustrated in FIG. 27B, on the real-time captured image as illustrated in FIG. 27A (S319). The verification result message m1 includes a "verification result" indicating whether the user is a verified user ("OK") or not ("NO"). If information for identifying the object, such as the user name, is obtained, the message m1 includes such information.

As described above, according to the first embodiment, S219 of generating the event message is performed, only when a number of detections of the objects is greater than the predetermined value at S216. That is, when the number of times of detection of a first object and a second object by the object detector 35 exceeds a predetermined value, the transmitter and receiver 51 transmits first image data based on the first object and second image data based on the second object to another apparatus such as the distributed data processing terminal 6 (S121). As illustrated in FIG. 27A, it is assumed that the imaging unit 40 of the image acquisition terminal 2 is detecting the user's face and card (a card printed with a photo of the user's face), for authentication of a particular user. In such case, other user, who is not subject to authentication, may present the user's card, or may walk through an image capturing area of the image acquisition terminal 2. If the terminal data processing device 5 transmits all images of users (faces) detected even for a short time period, data communication increases. In view of this, in this embodiment, the terminal data processing device 5 controls not to transmit the partial image data to the distributed data processing terminal 6, when an image of such user not subjected to authentication, which has been detected for a short time period, has been captured. This reduces a number of transmissions of processing requests (that is, the number of communications or the amount of data for communication), which are not necessary. This processing to control data transmission is referred to as a first communication control.

After the items of partial image data are sent, when the object detector 35 determines that two objects are detected (S221: YES), the operation proceeds to S222 to wait for a predetermined time period (preset cycle value), and further to S220 to reset the number of detections of objects to 0. That is, after the transmitter and receiver 51 transmits the first image data and the second image data, the object detector 35 may continue detecting one or more objects. In such case, when the object detector 35 still detects the first object and the second object, the transmitter and receiver 51 controls not to transmit the first image data and the second image data. For example, the user may still be present in the image capturing area of the image acquisition terminal 2, even after two items of partial image data are sent for user authentication. Accordingly, the image acquisition terminal 2 continues detecting the user's face and the photo of the user's card (that is, two objects) for a time longer than it is required. In view of this, S221, S222, and S220 are performed so as to prevent re-transmission of partial image data of the same user. For example, the object detector 35 does not count the number of detections (as the counted number is reset), even when the two objects are detected (S221: YES). This further reduces a number of processing requests to be transmitted (that is, the number of times of communications or the amount of data for communication), which are unnecessary. This processing to control data transmission is referred to as a second communication control.

On the other hand, when the detection result of S204 indicates that two objects (in this example, faces) are not detected (S221: NO), the operation proceeds to S223 to increase the number of non-detections by one, and further to S224. When the number of non-detections does not exceed the predetermined value (for example, ten times) (S224: NO), the operation proceeds to S225 to wait for the predetermined time period (defined by the preset cycle value), and further returns to S221. That is, after the transmitter and receiver 51 transmits the first image data and the second image data, the object detector 35 may continue detecting one or more objects. In such case, when the object detector 35 detects one object or more than two objects, or no object, the transmitter and receiver 51 controls not to transmit the first image data and the second image data. For example, even after two items of partial image data are sent for user authentication, it is most likely that the same user still exists in the image capturing area of the image acquisition terminal 2. For example, even when the detection result indicates that two faces are not detected at S221, there may be a case in which an image of the face of the same user may be kept captured. For example, if the same user has turned over the photograph of the user's card, such that the photograph faces toward the user, not toward the image acquisition terminal 2, only one object is detected. In another example, even when no object is detected, the same user may be present at least for a short time period right after two items of partial image data are sent. In view of this, S221 to S224 are performed so as to prevent re-transmission of partial image data of the same user. For example, the object detector 25 starts counting a number of non-detections of objects (that is, the number of times the two objects are not detected), and determines whether the counted number of non-detections exceeds the predetermined value. Until the number of non-detections exceeds the predetermined value (S224: YES), this processing of counting continues. This further reduces a number of processing requests to be transmitted (that is, the number of times of communications or the amount of data for communication), which are unnecessary. This processing to control data transmission is referred to as a third communication control.

Through performing any one of the first communication control, second communication control, and third communication control, the number of requests to be sent to the server is greatly reduced. This further reduces the overall cost required for using the service.

Second Embodiment

Referring to FIGS. 24, 26, and 30, operation of controlling communication is described according to a second embodiment. In the second embodiment, differences from the first embodiment are mainly described.

In the above-described embodiment, the distributed data processing terminal 6 transmits a request for verifying two items of partial image data, which have been detected, to the centralized data processing server 7. Alternatively, the distributed data processing terminal 6 may only send one item of partial image data (data to be verified), to the centralized data processing terminal 6, for user authentication. In such case, it is assumed that the centralized data processing server 7 stores feature value parameters of verification data, for example, in the storage unit 7000.

The communication system in the second embodiment is substantially similar to the communication system 1 for the first embodiment, except for some differences. The differences include data stored in the centralized data processing server 7.

Specifically, the storage unit 7000 of the centralized data processing server 7 stores a verification data management table as illustrated in FIG. 12. Specifically, as described above referring to FIG. 12, the verification data management table stores a file name of an image file (such as a facial image) as the verification data, feature values parameters of the image in the image file, and a name of an object identified with the image file, in association.

<<Operation>>

FIG. 30 is a flowchart illustrating an example of the verification processing, which differs from the flowchart described above referring to FIG. 28. First, the difference in operation between the first embodiment illustrated in FIG. 26 and the second embodiment is described. For simplicity, the event generation processing of the second embodiment is described using FIG. 26.

In the second embodiment, since only one item of partial image data (that is, data to be verified) is needed, S212 and S221 are modified to perform processing of determining whether one object (in this example, the user's face) is detected (S212A, S221A). Similarly, S214 is modified to perform processing of determining whether one object (such as the user's face) is in the verification area (S214A).

The event generation processing is described below referring to FIG. 26, with modified steps as described above.

As illustrated in FIG. 26, the object detector 35 sets a number of detections of a face (count) to 0 (S211). The object detector 35 determines whether a detection result generated at S204 indicates that one object (in this example, a face) is detected (S212A). When the detection result indicates that one object is not detected (S212A: NO), the operation proceeds to S213 to wait for a predetermined time period (preset cycle value), and returns to S211. For example, the preset cycle value is set to 30 times per second, such that detection is performed 30 times a second.

On the other hand, when the detection result of S204 indicates that one object (in this example, one face) is detected (S212A: YES), the operation proceeds to S214A. The determiner 33 determines whether the detected position of object is out of the verification area Q, which is an area that the object can be verified (S214A). When it is determined that the detected position of object is out of the verification area Q (S214A: NO), the operation proceeds to S213, and further to S211.

Since the verification area Q has been described above referring to FIG. 29, description thereof is omitted. Referring back to FIG. 26, when the determiner 33 determines that the detected object (i.e., the detected position) is within the verification area Q (S214A: YES), the object detector 35 increases the number of detections by one (S215), and the operation proceeds to S216. For example, if the coordinates of the upper left corner of the partial image data of the object are at the position indicated by the coordinates (x2, y2) in FIG. 29, the determiner 33 determines that the object is within the verification area Q. The object detector 35 then determines whether the number of detections is greater a predetermined value (S216). When the number of detections is greater the predetermined value (S216: YES), the operation proceeds to S218. In this example, the predetermined value may be any number that is arbitrarily set by the user, such as 10 times. When the number of detections is equal to or less than the predetermined value (S216: NO), the operation proceeds to S217 to wait for the predetermined time period (preset cycle value), and returns to S212A.

At S216, the operation proceeds to S218 only when the number of detections exceeds the predetermined value. It is assumed that the imaging unit 40 of the image acquisition terminal 2 is detecting the user's face, for authentication of a particular user. In such case, other user, who is not subject to authentication, may walk through an image capturing area of the image acquisition terminal 2. If the terminal data processing device 5 transmits all images of users (faces) detected even for a short time period, data communication increases. In view of this, in this embodiment, the terminal data processing device 5 does not transmit the partial image data to the distributed data processing terminal 6, when an image of such user not subjected to authentication, which has been detected for a short time period, has been captured. This reduces a number of transmissions of processing requests (that is, the number of communications or the amount of data for communication), which are not necessary. This processing to control data transmission is referred to as a first communication control.

When the object detector 35 determines that the number of detections exceeds the predetermined value (S216: YES), the image processing unit 34 encodes the partial image data, which is a part of the captured image that includes the detected face, in a general-purpose format such as JPEG (S218). The event generator 36 generates an event message notifying that the partial image data of the detected object is transmitted to the terminal data processing device 5 (S219). Specifically, the event generator 36 generates the event message such as "Send". The object detector 35 then sets (resets) a number of detections of object to 0 (S220), and the operation proceeds to S221A. In response to the event message generated at S219, the operation of S421 illustrated in FIG. 30 is performed. At S421, the terminal data processing device 5 transmits the partial image data including the detected face of the user, to the distributed data processing terminal 6.

After the partial image data is sent, the operation further proceeds to S221A to determine whether the detection result of S204 illustrated in FIG. 25 indicates that one object is detected. When the object detector 35 determines that one object is detected (S221: YES), the operation proceeds to S222 to wait for a predetermined time period (preset cycle value), and further to S220 to reset the number of detections of object to 0. For example, the user may still be present in the image capturing area of the image acquisition terminal 2, even after the partial image data is sent for user authentication. Accordingly, the image acquisition terminal 2 continues detecting the user's face for a time longer than it is required. In view of this, S221A, S222, and S220 are performed so as to prevent re-transmission of partial image data of the same user. For example, the object detector 35 does not count the number of detections (as the counted number is reset), even when the object is detected (S221A: YES). This further reduces a number of processing requests to be transmitted (that is, the number of times of communications or the amount of data for communication), which are unnecessary. This processing to control data transmission is referred to as a second communication control.

On the other hand, when the detection result of S204 indicates that one object is not detected (S221: NO), the operation proceeds to S223 to increase the number of non-detections by one, and further to S224. When the number of non-detections does not exceed the predetermined value (for example, ten times) (S224: NO), the operation proceeds to S225 to wait for the predetermined time period (defined by the preset cycle value), and further returns to S221A. For example, even partial image data is sent for user authentication, it is most likely that the same user still exists in the image capturing area of the image acquisition terminal 2 at least for a short period of time. For example, even when the detection result indicates that one face is not detected at S221A, the same user may have turned around or looked away, such that no object (user's face) can be captured at the image acquisition terminal 2. Based on this assumption, S221A to S224 are performed so as to prevent re-transmission of partial image data of the same user. For example, the object detector 25 starts counting a number of non-detections of objects (that is, the number of times the object is not detected), and determines whether the counted number of non-detections exceeds the predetermined value. Until the number of non-detections exceeds the predetermined value (S224: YES), this processing of counting continues. This further reduces a number of processing requests to be transmitted (that is, the number of times of communications or the amount of data for communication), which are unnecessary. This processing to control data transmission is referred to as a third communication control.

When the number of detections exceeds the predetermined value (for example, 10 times) (S224: YES), the operation proceeds to S213 to wait for the predetermined time period, and returns to S211.

The real-time processing of S111 illustrated in FIG. 24 then ends. Referring back to FIG. 24, the communication unit 48 transmits the event message generated at S219 and the partial image data (in this example, one item of partial image data) to which distortion correction is applied at S205 (FIG. 25) to the communication unit 58 of the terminal data processing device 5 (S115). When real-time detection of an object (human face) is not necessary, such as in the example case where the distributed processing system 100 is disposed in a shop or the like, the real-time data processing terminal 3 may accumulate the event message and the partial image data in its local memory during a day, when the shop is opened. After the shop is closed, for example, during the night, the real-time data processing terminal 3 may transmit the event message and the partial image data to the terminal data processing device 5.

<Verification Processing>

Next, referring to FIG. 30, processing of verifying data to be verified, i.e., the partial image data, is described, according to an embodiment. FIG. 30 is a flowchart illustrating an example of the verification processing, which differs from the flowchart described above referring to FIG. 28.

Referring to FIG. 27, in the distributed data processing terminal 6, when the transmitter and receiver 61 receives the partial image data as the data to be verified through the processing of S421, the transmitter and receiver 61 transmits the verification request to the centralized data processing server 7 (S511). The verification request includes the data to be verified. The centralized data processing server 7 receives the verification request at the transmitter and receiver 71.

Next, in the centralized data processing server 7, the feature value generator 74 converts the data to be verified that is received at S511 into bitmap data, to generate feature value parameters for the data to be verified (S512) Such feature value parameters are used to identify an individual using various types of information that can be discriminative such as height or slope of facial components such as a nose or eyes detected in the face image. Then, the storing and reading unit 79 searches the storing unit 7000 to determine whether or not there is any feature value parameter for the registered verification data (S513). If it is determined at S513 that there is the feature value parameter of the registered verification data (S513: YES), the verification unit 75 compares the feature value parameters between the verification data and the data to be verified, and calculates the degree of similarity between these data (S514). The operation then returns to S513, to repeat the processing of S513 and S514 until similarity is calculated for the feature value parameters of all the registered verification data with respect to the data to be verified. On the other hand, if it is determined at S513 that there is no feature value parameter of the registered verification data (including the case where there is absolutely no parameter), the operation proceeds to S515.

Next, the storing and reading unit 79 temporarily stores, in the storage unit 7000, the "name" of verification data having the feature values read from the storage unit 7000, and the "similarity" calculated at S514, in association (S515).

Next, the storing and reading unit 79 reads out the similarity of the verification data having the maximum similarity, which is selected from among the verification data each having the calculated similarity that is temporarily stored in the storage unit 7000 (S516). Then, the transmitter and receiver 71 transmits the response information indicating the response to the verification request received at S511 to the distributed data processing terminal 6b (S517). This response information includes the "similarity" of the verification data that is read out at S516. The response information may include the "name" stored in the storage unit 7000, which may be obtained at S515 for the identified verification data, in addition to the similarity.

Next, the determiner 63 of the distributed data processing terminal 6 compares the calculated similarity with a predetermined threshold (for example, 0.8), and determines that the detected object matches the verification data when the similarity is greater than the threshold. When the calculated similarity is equal to or less than the threshold, the distributed data processing terminal 6 determines that the detected object does not match the verification data (S518). The display control 67 controls the display 517 of the distributed data processing terminal 6, to display the verification result message as illustrated in FIG. 27B, on the real-time captured image as illustrated in FIG. 27A (S519). The verification result message m1 includes a "verification result" indicating whether the user is a verified user ("OK") or not ("NO"). If information for identifying the object, such as the user name, is obtained, the message m1 includes such information.

As described above, according to the second embodiment, since only data to be verified is transmitted, communication load is further reduced compared to the example case of the first embodiment described above.

In any one of the above-described embodiments, since a number of requests to be sent to the server is reduced, an amount of charge for using the service provided by the server can also be reduced.

In any one of the above-described embodiments, the real-time data processing terminal 3 determines whether a number of detections of one or more objects exceeds (that is, greater than) a predetermined value (S216, S224), the real-time data processing terminal 3 may determine whether a number of detections is equal to or greater than the predetermined value (that is, whether a number of detections reaches the predetermined value).

In any one of the above-described embodiments, the object detector 35 detects coordinates (position) of the object in the captured image by image processing. Alternatively, the object detector 35 may employ any other means to detect the location of the object. For example, LiDAR (Light Detection and Ranging) may be used, which irradiates a laser light to the object, and measures a distance to the object based on a reflected light. Using LiDAR, for example, even when an image captured by the imaging unit shows two objects overlapping each other in front and back, two objects can be recognized as separate objects, while preventing an error in detection.

In any one or more of the above-described embodiments, any desired data other than the captured image data that has been captured with the imaging unit 40 may be processed, such as image data created by the user. That is, examples of image data to be processed include the captured image data and the image data created by the user. Alternatively, the image acquisition terminal 2, which is an example of a communication terminal, may generate image data rather than obtaining the image data from the outside. Further, the image acquisition terminal 2 may acquire data other than image data, such as audio data by collecting audio or even temperature data from a temperature sensor, or humidity data from a humidity sensor.

Further, any one of the CPUs 301, 501, and 701, etc. may be a single processor or a multiple processor. Similarly, any one of the image acquisition terminal 2, the distributed data processing terminal 6, and the centralized data processing server 7 may be implemented by one or more apparatus such as one or more computers. The distributed data processing terminal 6 may also operate as a server.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), System on Chip (SOC), and graphical processing unit (GPU), and conventional circuit components arranged to perform the recited functions.

The illustrated apparatuses are only illustrative of one of several computing environments for implementing the embodiments disclosed herein. For example, in some embodiments, any of the servers in the communication system 1 includes a plurality of computing devices, e.g., a server cluster, that are configured to communicate with each other over any type of communications link, including a network, a shared memory, etc. to collectively perform the processes disclosed herein.

Moreover, the service providing server 8 and the authentication server 9 can be configured to share the processing of authenticating the user in various combinations. That is, the illustrated elements of the service providing server 8 and the authentication server 9 can be combined into a single server apparatus, or divided between a plurality of machines in combinations other than that shown in any of the above-described figures.

The invention claimed is:

1. A communication system, comprising:
a data processing terminal; and
a communication terminal communicably connected to the data processing terminal, the communication terminal configured to communicate with a server via the data processing terminal, and the communication terminal comprising circuitry configured to:
  detect one or more objects in an image of one or more images that are sequentially captured with a camera;
  count a number of object detections, every time two objects are detected in the image; and
  transmit, to the server, one or more items of image data each including each one of the detected one or more objects, based on a determination that the counted number of object detections reaches or exceeds a predetermined value, wherein
the data processing terminal is configured to:
  transmit a request for verifying a first object to the server, with the first image data and the second image data received from the communication terminal; and
  receive a response including a verification result based on a similarity between the first image data and the second image data.

2. The communication system of claim 1, wherein the circuitry is further configured to, for at least a predetermined time period after transmission of the number of items of image data, prohibit transmission of image data including each one of detected one or more objects to the server.

3. The communication system of claim 2, wherein the circuitry is further configured to, after transmission of the number of items of image data:
  determine whether the two objects are not detected; and
  prohibit transmission of image data including each one of detected one or more objects to the server in a case that the circuitry determines that the two objects are not detected.

4. The communication system of claim 2, wherein the circuitry is further configured to, after transmission of the image data, prohibit counting of the number of object detections.

5. The communication system of claim 4, wherein the circuitry is further configured to, after transmission of the image data:
  start counting a number of non-detections, every time the two objects are not detected in the image; and
  end counting the number of non-detections, based on a determination that the counted number of non-detections reaches or exceeds a predetermined value.

6. The communication system of claim 1, wherein the circuitry is further configured to:
  count the number of object detections every time the first object and a second object are detected in the image; and
  transmit first image data including the detected first object and second image data including the detected second object, based on the determination that the counted number of object detections reaches or exceeds the predetermined value.

7. The communication system of claim 1, wherein the data processing terminal is further configured to control a display to display information generated based on the verification result received from the server.

8. The communication system of claim 1, wherein
the first object is an object to be verified, and
a second object is an object used for verification of the first object.

9. A method of controlling communication of data with a server, the method comprising:
- detecting one or more objects in an image of one or more images that are sequentially captured with a camera;
- counting a number of object detections, every time two objects are detected in the image;
- determining, by a communication terminal, whether the counted number of object detections reaches or exceeds a predetermined value;
- transmitting, by the communication terminal to the server via a data processing terminal, one or more items of image data each including each one of the detected one or more objects; when the determining indicates that the counted number of object detections reaches or exceeds the predetermined value;
- transmitting, by the data processing terminal to the server, (i) a request for verifying a first object with (ii) the first image data and the second image data received from the communication terminal; and
- receiving, by the data processing terminal, a response including a verification result based on a similarity between the first image data and the second image data.

10. The method of claim 9, further comprising:
- after transmitting the one or more items of image data, prohibiting transmission of image data including each one of detected one or more objects to the server.

11. The method of claim 10, further comprising:
- after transmitting the one or more items of image data:
  - determining whether the two objects are not detected; and
  - prohibiting transmission of image data including each one of detected one or more objects to the server in a case that the determining indicates that the two objects are not detected.

12. The method of claim 10, further comprising, after transmitting the image data, prohibiting counting of the number of object detections.

13. The method of claim 12, further comprising:
- after transmitting the image data:
  - starting counting of a number of non-detections, every time the two objects are not detected in the image; and
  - ending counting of the number of non-detections, based on a determination that the counted number of non-detections reaches or exceeds a predetermined value.

14. The method of claim 9, further comprising:
- counting the number of object detections every time the first object and a second object are detected in the image; and
- transmitting first image data including the detected first object and second image data including the detected second object, based on the determination that the counted number of object detections reaches or exceeds the predetermined value.

15. A non-transitory recording medium which, when executed by one or more processors, cause the processors to perform a method of controlling a communication terminal to communicate data with a server, the method comprising:
- detecting one or more objects in an image of one or more images that are sequentially captured with a camera;
- counting a number of object detections, every time two objects are detected in the image;
- determining whether the counted number of object detections reaches or exceeds a predetermined value; and
- transmitting, to the server via a data processing terminal, one or more items of image data each including each one of the detected one or more objects, when the determining indicates that the counted number of object detections reaches or exceeds the predetermined value, wherein
- the data processing terminal transmits, to the server, (i) a request for verifying a first object with (ii) the first image data and the second image data received from the communication terminal, and
- the data processing terminal receives a response including a verification result based on a similarity between the first image data and the second image data.

* * * * *